United States Patent
Jee et al.

(10) Patent No.: US 12,524,122 B2
(45) Date of Patent: Jan. 13, 2026

(54) INPUT SENSOR, DISPLAY DEVICE AND DRIVING METHOD THEREOF

(71) Applicant: SAMSUNG DISPLAY CO., LTD., Yongin-si (KR)

(72) Inventors: Yongjin Jee, Yongin-si (KR); Hyojin Lee, Yongin-si (KR); Kyounghun Been, Yongin-si (KR); Hoeung Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/947,141

(22) Filed: Nov. 14, 2024

(65) Prior Publication Data

US 2025/0165108 A1 May 22, 2025

(30) Foreign Application Priority Data

Nov. 21, 2023 (KR) .................... 10-2023-0161966

(51) Int. Cl.
*G06F 3/044* (2006.01)

(52) U.S. Cl.
CPC .................... *G06F 3/0446* (2019.05)

(58) Field of Classification Search
CPC .. G06F 3/0412; G06F 3/0446; G06F 3/04166; G06F 2203/04108
See application file for complete search history.

(56) References Cited

U.S. PATENT DOCUMENTS

| | | | |
|---|---|---|---|
| 9,274,589 B2 | 3/2016 | Park | |
| 9,357,045 B2 | 5/2016 | Oishi et al. | |
| 9,507,460 B2 | 11/2016 | Lee et al. | |
| 11,231,810 B2 | 1/2022 | Kim et al. | |
| 2022/0107703 A1* | 4/2022 | Lee ..................... | G06F 3/0446 |
| 2022/0244829 A1* | 8/2022 | Lee ..................... | G06F 3/0412 |

FOREIGN PATENT DOCUMENTS

| | | |
|---|---|---|
| KR | 10-1572331 B1 | 11/2015 |
| KR | 10-1634642 B1 | 6/2016 |
| KR | 10-2021-0003986 A | 1/2021 |

* cited by examiner

*Primary Examiner* — Deeprose Subedi
(74) *Attorney, Agent, or Firm* — F. CHAU & ASSOCIATES, LLC

(57) ABSTRACT

An input sensor of a display device includes a plurality of first electrodes, a plurality of second electrodes crossing the plurality of first electrodes, and a sensor driver selectively operating in a first proximity sensing mode and a second proximity sensing mode. The sensor driver outputs a plurality of transmission signals to the plurality of first electrodes and receives sensing signals from the plurality of second electrodes. The plurality of transmission signals includes a signal swinging between a first high level and a first low level during the first proximity sensing mode. The plurality of transmission signals is a signal swinging between a second high level and a second low level during a second proximity sensing mode. The second high level is a voltage level greater than the first high level.

20 Claims, 19 Drawing Sheets

FIG. 11B

TXB1, TXB3, TXB5, TXB7, TXB9, TXB11 : TXB
RX2, RX4, RX6, RX8, RX10, RX12 : RX

RX1, RX3, RX5, RX7, RX9, RX11 : RX
TXB2, TXB4, TXB6, TXB8, TXB10, TXB12 : TXB

INPUT SENSOR, DISPLAY DEVICE AND DRIVING METHOD THEREOF

CROSS-REFERENCE TO RELATED APPLICATIONS

This application claims priority under 35 U.S.C. § 119 to Korean Patent Application No. 10-2023-0161966, filed on Nov. 21, 2023, in the Korean Intellectual Property Office, the disclosure of which is incorporated by reference in its entirety herein.

1. TECHNICAL FIELD

Embodiments of the present disclosure described herein relate to an input sensor having a touch function and a proximity sensing function, and a display device including the input sensor.

2. DISCUSSION OF RELATED ART

Multimedia display devices, such as a television, a mobile phone, a tablet computer, a navigation system and a game console, may display images for providing a variety of visual information to the user. In addition to a general input method such as a button, a keyboard, a mouse, or the like, the display devices may include a touch sensor that provides a touch-based input method allowing a user to enter information or commands easily and intuitively.

SUMMARY

Embodiments of the present disclosure provide an input sensor having a touch function as well as a proximity sensing function, and a display device including the input sensor.

According to an embodiment of the present disclosure, an input sensor of a display device includes a plurality of first electrodes, a plurality of second electrodes crossing the plurality of first electrodes, and a sensor driver selectively operating in a first proximity sensing mode and a second proximity sensing mode. The sensor driver outputs a plurality of transmission signals to the plurality of first electrodes and receives sensing signals from the plurality of second electrodes. The plurality of transmission signals includes a signal swinging between a first high level and a first low level during the first proximity sensing mode. The plurality of transmission signals is a signal swinging between a second high level and a second low level during a second proximity sensing mode. The second high level is a voltage level greater than the first high level.

According to an embodiment, during the first proximity sensing mode and the second proximity sensing mode, the sensor driver may output the signal swinging between a first high level and a first low level and the signal swinging between the second high level and the second low level, respectively, only to some of the plurality of first electrodes.

According to an embodiment, during the first proximity sensing mode, the sensor driver may output the plurality of transmission signals of the first low level to some of the plurality of first electrodes, and during the second proximity sensing mode, the sensor driver may output the plurality of transmission signals of the second low level to some of the plurality of first electrodes.

According to an embodiment, some of the plurality of first electrodes may be in a non-driven state during the first proximity sensing mode, and some of the plurality of first electrodes may be in the non-driven state during the second proximity sensing mode.

According to an embodiment, during the second proximity sensing mode, the sensor driver may output a plurality of first transmission signals to the plurality of first electrodes, during a first time of the second proximity sensing mode, may output a plurality of second transmission signals to second electrodes of a first group among the plurality of second electrodes, and may receive the sensing signals from second electrodes of a second group among the plurality of second electrodes.

According to an embodiment, during the second proximity sensing mode, each of the plurality of first transmission signals and the plurality of second transmission signals may be a signal swinging between the second high level and the second low level.

According to an embodiment, during a second time of the second proximity sensing mode different from the first time of the second proximity sensing mode, the sensor driver may output the plurality of second transmission signals to the second electrodes of the second group among the plurality of second electrodes, and may receive the sensing signals from the second electrodes of the first group among the plurality of second electrodes.

According to an embodiment, the sensor driver may receive a mode signal and may operate in the first proximity sensing mode when the mode signal indicates a call mode.

According to an embodiment, the sensor driver may generate raw data based on the sensing signals received from the plurality of second electrodes during the first proximity sensing mode, and may determine whether an object has approached based on the raw data.

According to an embodiment, the sensor driver may operate in the second proximity sensing mode when it is determined that the object has not been approached during the first proximity sensing mode.

According to an embodiment, the sensor driver may provide a proximity signal to an outside when it is determined that the object is approached during the first proximity sensing mode.

According to an embodiment, the sensor driver may generate raw data based on the sensing signals received from the plurality of second electrodes during the second proximity sensing mode, may determine whether an object has approached based on the raw data, and may provide a proximity signal to an outside when it is determined that the object has approached.

According to an embodiment of the present disclosure, a display device includes a display layer displaying an image, a display driver that drives the display layer, a sensor layer disposed on the display layer and that includes a plurality of first electrodes and a plurality of second electrodes. A sensor driver selectively operating in a first proximity sensing mode and a second proximity sensing mode. The sensor driver outputs a plurality of transmission signals to the plurality of first electrodes and receives sensing signals from the plurality of second electrodes. The plurality of transmission signals includes a signal swinging between a first high level and a first low level during a first proximity sensing mode, and the plurality of transmission signals includes a signal swinging between a second high level and a second low level during a second proximity sensing mode, and the second high level is a voltage level greater than the first high level.

According to an embodiment, some of the plurality of first electrodes may be in a non-driven state during the first proximity sensing mode, and some of the plurality of first electrodes may be in the non-driven state during the second proximity sensing mode.

According to an embodiment, during the second proximity sensing mode, the sensor driver may output a plurality of first transmission signals to the plurality of first electrodes, may output a plurality of second transmission signals to second electrodes of a first group among the plurality of second electrodes, and may receive the sensing signals from second electrodes of a second group among the plurality of second electrodes.

According to an embodiment, during the second proximity sensing mode, each of the plurality of first transmission signals and the plurality of second transmission signals may be a signal swinging between the second high level and the second low level.

According to an embodiment of the present disclosure, a method of driving a display device includes determining whether a mode signal indicates a call mode, when the mode signal indicates the call mode, operating in a first proximity sensing mode comprising transmitting a transmission signal swinging between a first high level and a first low level to a plurality of first electrodes and receiving sensing signals from a plurality of second electrodes crossing the plurality of first electrodes, obtaining raw data based on the sensing signals during the first proximity sensing mode, and determining whether an object has approached the display device based on the raw data, when it is not determined that the object is approached, operating in a second proximity sensing mode comprising transmitting the transmission signal swinging between a second high level and a second low level to the plurality of first electrodes and receiving the sensing signals from the plurality of second electrodes, and obtaining raw data based on the sensing signals during the second proximity sensing mode, and determining whether the object has approached the display device based on the raw data. The second high level is a voltage level greater than the first high level.

According to an embodiment, in the operating in the first proximity sensing mode, some of the plurality of first electrodes may be in a non-driven state, and in the operating in the second proximity sensing mode, some of the plurality of first electrodes may be in the non-driven state.

According to an embodiment, the operating in the second proximity sensing mode may include outputting a plurality of first transmission signals to the plurality of first electrodes, outputting a plurality of second transmission signals to second electrodes of a first group among the plurality of second electrodes, and receiving the sensing signals from second electrodes of a second group among the plurality of second electrodes.

According to an embodiment, in the operating in the second proximity sensing mode, each of the plurality of first transmission signals and the plurality of second transmission signals may be a signal swinging between the second high level and the second low level.

BRIEF DESCRIPTION OF THE DRAWINGS

The above and other objects and features of the present disclosure will become apparent by describing in detail embodiments thereof with reference to the accompanying drawings.

FIG. 11B is a diagram illustrating second raw data generated when a proximity of an object by a user's body is sensed according to an embodiment of the present disclosure.

DETAILED DESCRIPTION OF EMBODIMENTS

Figure 1:
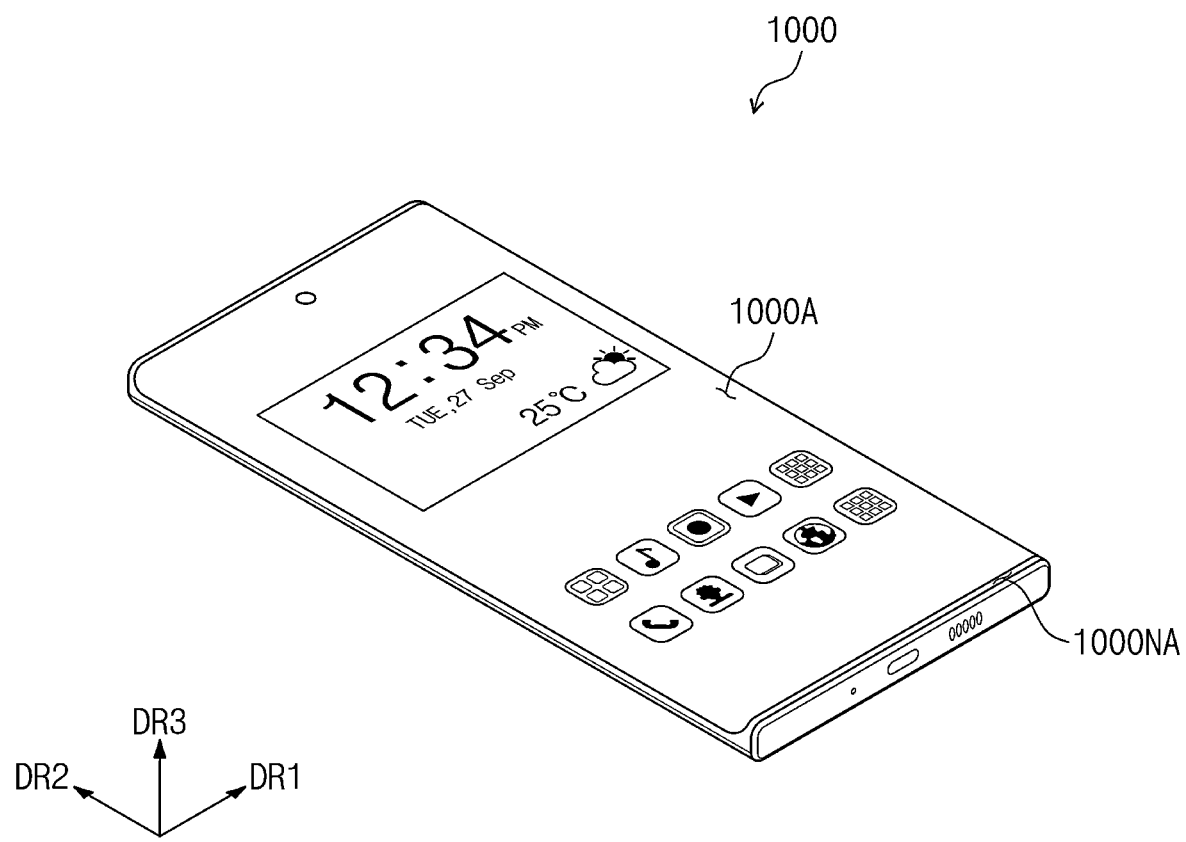
FIG. 1 is a perspective view illustrating a display device, according to an embodiment of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component. When one component (or area, layer, part, or the like) is referred to as being "directly on", "directly connected to", or "directly coupled to" another component, no intervening elements may be present.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, a first component may be named as a second component, and vice versa, without departing from the spirit or scope of the present disclosure. A singular form, unless otherwise stated, includes a plural form.

Also, the terms "under", "beneath", "on", "above" are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a perspective view illustrating a display device 1000, according to an embodiment of the present disclosure.

Referring to FIG. 1, the display device 1000 may be a device that is activated, in response to an electrical signal. For example, in an embodiment the display device 1000 may be a mobile phone, a foldable mobile phone, a notebook computer, a television, a tablet computer, a car navigation system, a game console, or a wearable device. However, embodiments of the present disclosure are not necessarily limited thereto. FIG. 1 illustrates that display device 1000 is a mobile phone as an example.

An active area 1000A and a peripheral area 1000NA may be defined in the display device 1000. The display device 1000 may display images through the active area 1000A. In an embodiment, the active area 1000A may include a surface extending in a first direction DR1 and a second direction DR2. The peripheral area 1000NA may surround the active area 1000A (e.g., in the first and second directions DR1, DR2).

A thickness direction of the display device 1000 may be parallel to a third direction DR3 crossing the first direction DR1 and the second direction DR2. Accordingly, a front surface (e.g., a top surface) and a rear surface (e.g., a bottom surface) of members forming the display device 1000 may be defined based on the third direction DR3.

Figure 2:
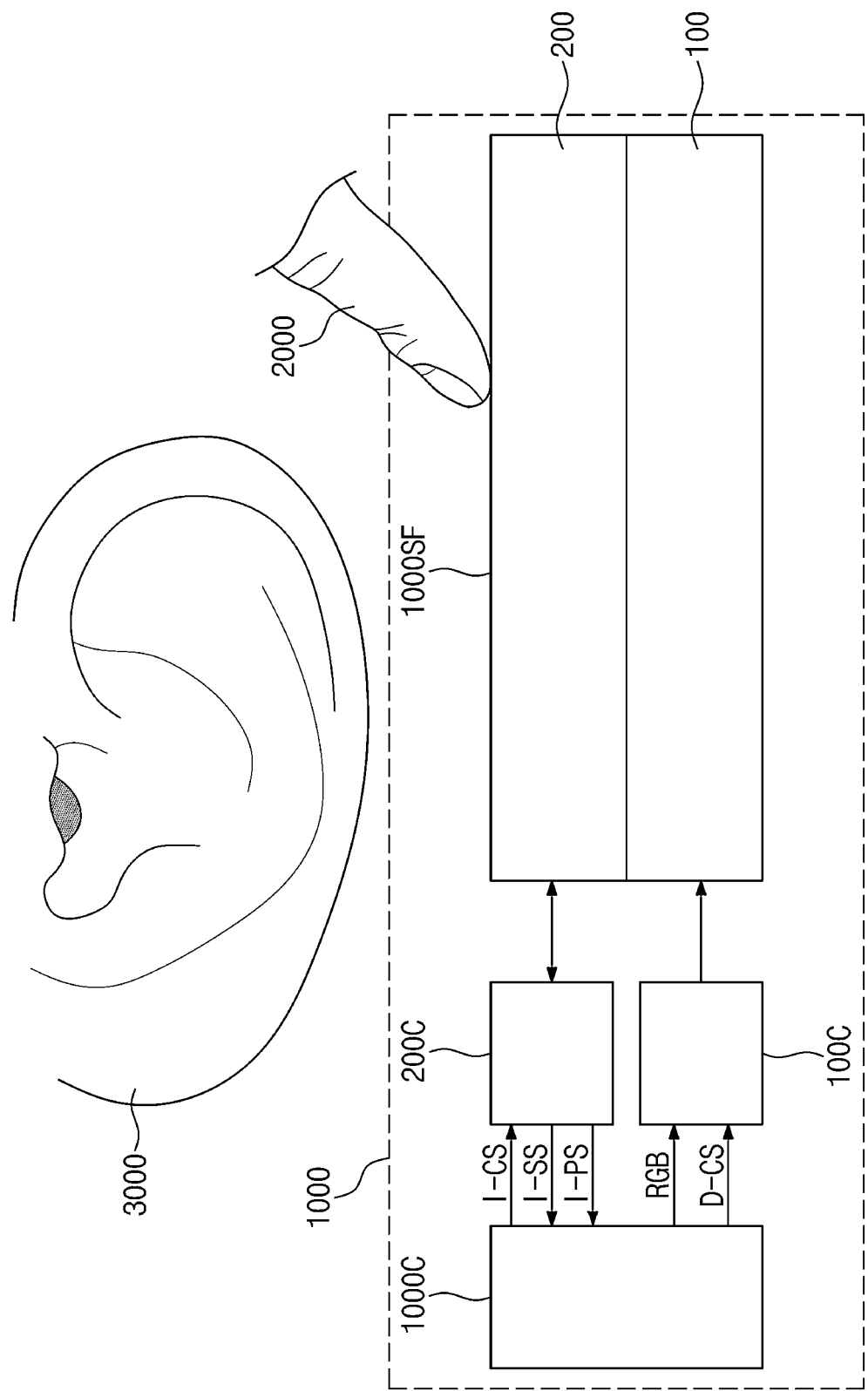
FIG. 2 is a diagram describing an operation of a display device, according to an embodiment of the present disclosure.

FIG. 2 is a diagram for describing an operation of the display device 1000, according to an embodiment of the present disclosure.

Referring to FIG. 2, the display device 1000 may include a display layer 100, a sensor layer 200, a display driver 100C, a sensor driver 200C, and a main driver 1000C. In an embodiment, the sensor layer 200 and the sensor driver 200C may be referred to as an input sensor.

The display layer 100 may be an element configured to generate an image for viewing by the user. In an embodiment, the display layer 100 may be a light emitting display layer. For example, the display layer 100 may include an organic light emitting display layer, an inorganic light emitting display layer, an organic-inorganic light emitting display layer, a quantum dot display layer, a micro LED display layer, or a nano LED display layer. However, embodiments of the present disclosure are not necessarily limited thereto.

The sensor layer 200 may be disposed on the display layer 100. The sensor layer 200 may sense a touch input 2000 applied from the outside or the approach of an object 3000 (e.g., a proximity of an object 3000). The touch input 2000 or the object 3000 may include any input means capable of providing a change in capacitance. For example, the sensor layer 200 may sense not only a passive type of input means such as a user's body, but also an input by an active type of input means providing a driving signal.

The main driver 1000C may control the overall operation of the display device 1000. For example, in an embodiment the main driver 1000C may control operations of the display driver 100C and the sensor driver 200C. The main driver 1000C may be referred to as a microprocessor, graphics controller, application processor, central processing unit, or main processor.

The display driver 100C may drive the display layer 100. In an embodiment, the display driver 100C may receive image data RGB and a control signal D-CS from the main driver 1000C. The control signal D-CS may include various signals. For example, in an embodiment the control signal D-CS may include a vertical synchronization signal, a horizontal synchronization signal, a clock signal, a data enable signal, etc. The display driver 100C may output various signals such that an image may be displayed on the display layer 100 based on the control signal D-CS.

The sensor driver 200C may drive the sensor layer 200. The sensor driver 200C may receive a control signal I-CS from the main driver 1000C. In an embodiment, the control signal I-CS may include a mode signal for determining a driving mode of the sensor driver 200C and a clock signal.

The sensor driver 200C may calculate coordinate information of an input based on a signal received from the sensor layer 200 and may provide a coordinate signal I-SS including the coordinate information to the main driver 1000C. The main driver 1000C allows an operation corresponding to a user input to be executed based on the coordinate signal I-SS. For example, the main driver 1000C may operate the display driver 100C such that a new image is displayed on the display layer 100.

In an embodiment, the sensor driver 200C may provide a proximity signal I-PS generated by the object 3000 spaced from a surface 1000SF of the display device 1000 based on a signal received from the sensor layer 200 to the main driver 1000C. For example, in an embodiment the ear of a user that approaches the display device 1000 (and the input sensor) is illustrated as an example of the spaced object 3000. However, embodiments of the present disclosure are not necessarily limited thereto.

In an embodiment, the sensor driver 200C may provide the proximity signal I-PS to the main driver 1000C when it is determined that the spaced object 3000 has approached the surface 1000SF of the display device 1000 (and the input sensor). The main driver 1000C may operate the display driver 100C in response to the proximity signal I-PS such that luminance of the image displayed on the display layer 100 is decreased or the image is not displayed on the display layer 100. For example, in an embodiment the main driver 1000C may turn off the display layer 100.

In addition, in an embodiment, when it is determined that the object 3000 has approached the surface 1000SF of the display device 1000, the main driver 1000C may enter a sleep mode. Even if the main driver 1000C enters the sleep mode, the sensor layer 200 and the sensor driver 200C may maintain operation. Therefore, when the object 3000 moves away from the surface 1000SF of the display device 1000, the sensor driver 200C may determine this state and may provide a signal to release the sleep mode of the main driver 1000C to the main driver 1000C.

In an embodiment, the sensor driver 200C may provide raw data generated when the object 3000 has approached the surface 1000SF of the display device 1000 as the proximity signal I-PS to the main driver 1000C.

The main driver 1000C may receive the proximity signal I-PS, process the proximity signal I-PS, and determine a proximity touch based on the processed proximity signal I-PS. For example, in an embodiment the main driver 1000C may predict noise of the proximity signal I-PS using an artificial intelligence algorithm and may determine whether the object 3000 has approached the display device 1000. According to an embodiment, the sensor driver 200C does not determine whether the object 3000 has approached the display device 1000, but the main driver 1000C, which receives the proximity signal I-PS, may determine whether the object 3000 has approached. In an embodiment, the main driver 1000C may determine whether the object 3000 is sensed after processing the proximity signal I-PS using an artificial intelligence algorithm. Afterwards, based on the processing of the proximity signal I-PS to determine whether the object 3000 is sensed, the main driver 1000C may operate the display driver 100C such that luminance of the image displayed on the display layer 100 is decreased or the image is not displayed on the display layer 100. In an embodiment, when it is determined that the object 3000 has approached the display device 1000, the main driver 1000C may enter a sleep mode.

Figure 3:
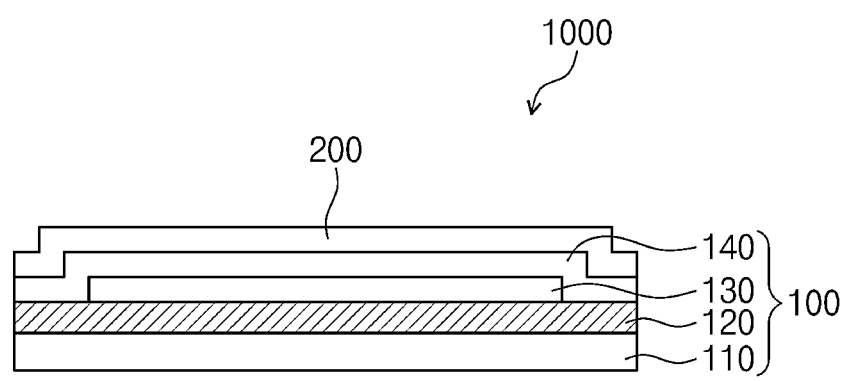
FIG. 3 is a schematic cross-sectional view of a display device, according to an embodiment of the present disclosure.
Figure 3:
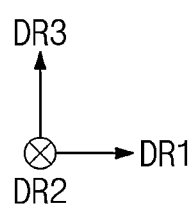

FIG. 3 is a schematic cross-sectional view of the display device 1000, according to an embodiment of the present disclosure.

Referring to FIG. 3, the display device 1000 may include the display layer 100 and the sensor layer 200 disposed on the display layer 100 (e.g., in the third direction DR3). The display layer 100 may be referred to as a display panel, and the sensor layer 200 may be referred to as a sensor or an input sensing layer.

In an embodiment, the display layer 100 may include a base layer 110, a circuit layer 120, a light emitting element layer 130, and an encapsulation layer 140.

The base layer 110 may be a member that provides a base surface on which the circuit layer 120 is disposed. In an embodiment, the base layer 110 may be a glass substrate, a metal substrate, a polymer substrate, or the like. However, embodiments of the present disclosure are not necessarily limited thereto. For example, in some embodiments the base layer 110 may be an inorganic layer, an organic layer, or a composite material layer.

In an embodiment, the base layer 110 may have a multi-layered structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. However, embodiments of the present disclosure are not necessarily limited thereto. The silicon oxide layer and the amorphous silicon layer may be referred to as a 'base barrier layer'.

In an embodiment, each of the first and second synthetic resin layers may include polyimide-based resin. Also, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin. The wording "~~-based resin" in the specification indicates that "~~-based resin" includes a functional group of "~~".

The circuit layer 120 may be disposed on the base layer 110 (e.g., disposed directly thereon in the third direction DR3). In an embodiment, the circuit layer 120 may include an insulating layer, a semiconductor pattern, a conductive pattern, a signal line, and the like. For example, an insulating layer, a semiconductor layer, and a conductive layer may be formed on the base layer 110 by a coating or deposition process, and the insulating layer, the semiconductor layer, and the conductive layer may then be selectively patterned through a plurality of photolithography processes. Thereafter, a semiconductor pattern, a conductive pattern, and a signal line included in the circuit layer 120 may be formed.

The light emitting element layer 130 may be disposed on the circuit layer 120 (e.g., disposed directly thereon in the third direction DR3). The light emitting element layer 130 may include a light emitting element. For example, in an embodiment the light emitting element layer 130 may include an organic light emitting material, an inorganic light emitting material, an organic-inorganic light emitting material, a quantum dot, a quantum rod, a micro-LED, or a nano-LED.

The encapsulation layer 140 may be disposed on the light emitting element layer 130 (e.g., disposed directly thereon). The encapsulation layer 140 may protect the light emitting element layer 130 from moisture, oxygen, and foreign substances such as dust particles.

The sensor layer 200 may be disposed on the display layer 100 (e.g., disposed directly thereon). The sensor layer 200 may detect an external input applied to the sensor layer 200 from an outside (e.g., the external environment). The external input may be a user input. For example, in an embodiment the user input may include various types of external inputs such as a part of a user's body, light, heat, a pen, or pressure. However, embodiments of the present disclosure are not necessarily limited thereto.

In an embodiment, the sensor layer 200 may be formed on the display layer 100 through a successive process. In this embodiment, the sensor layer 200 may be expressed as being disposed directly on the display layer 100. The wording "~being disposed directly~" may indicate that a third component is not interposed between the sensor layer 200 and the display layer 100. For example, an additionally adhesive member may not be interposed between the sensor layer 200 and the display layer 100 (e.g., in the third direction DR3).

The signal provided from the sensor layer 200 may include noise caused by the display layer 100. For example, the change in noise included in the signal provided from the sensor layer 200 may be greater when the image displayed on the display layer 100 changes than when the image displayed on the display layer 100 is static or is not generated. According to an embodiment of the present disclosure, the main driver 1000C (refer to FIG. 2) may predict noise in the signal provided from the sensor layer 200 using an artificial intelligence algorithm and may determine whether or not there is a proximity touch. Accordingly, the accuracy of proximity determination may be increased. A description for this will be provided later.

In an embodiment, the display device 1000 may further include an anti-reflection layer and an optical layer disposed on the sensor layer 200. The anti-reflection layer may reduce reflectance of external light incident from the outside of the display device 1000. The optical layer may increase the front luminance of the display device 1000 by controlling a direction of the light incident from the display layer 100.

Figure 4:
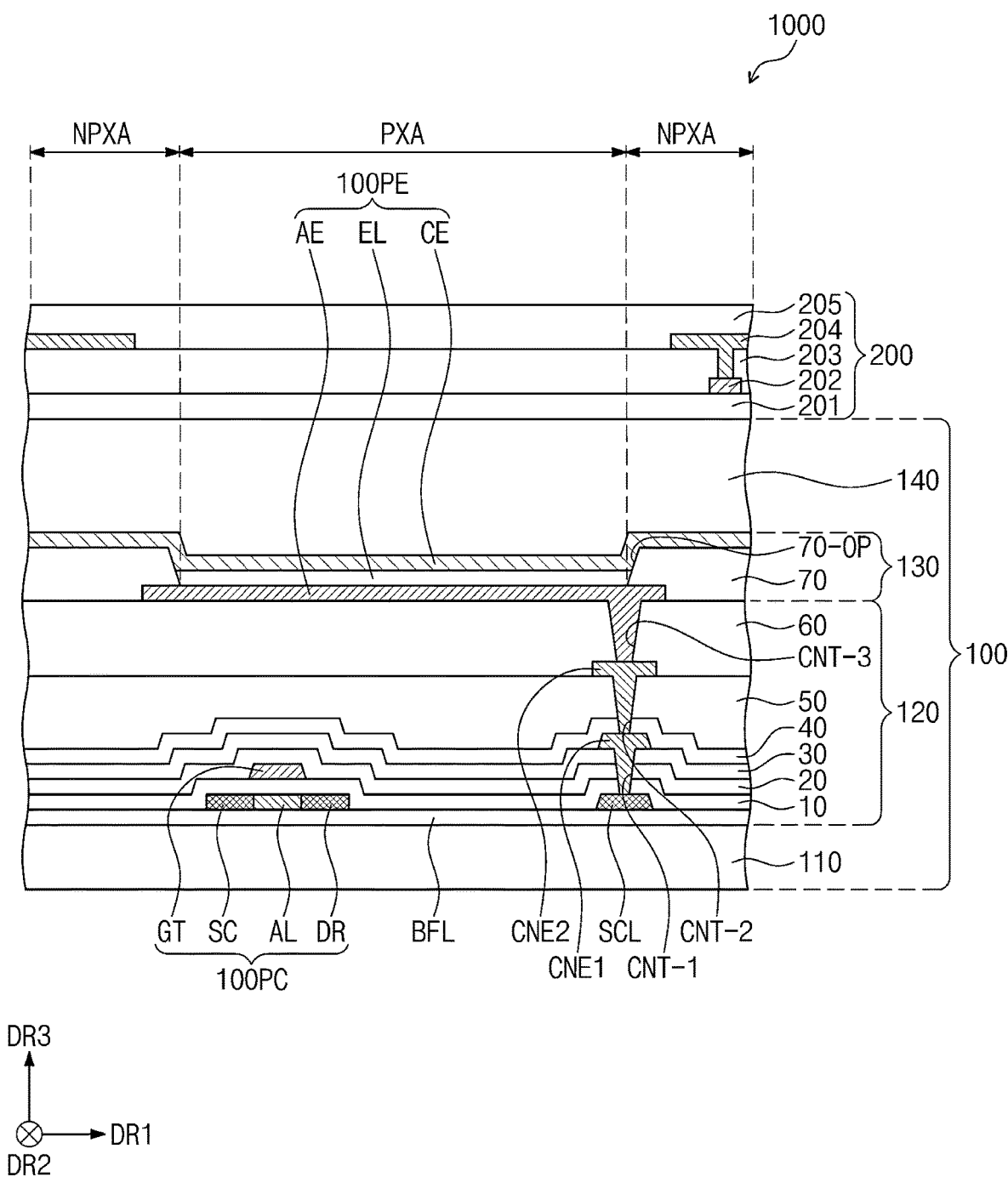
FIG. 4 is a cross-sectional view of a display device, according to an embodiment of the present disclosure.

FIG. 4 is a cross-sectional view of a display device, according to an embodiment of the present disclosure.

Referring to FIG. 4, at least one inorganic layer is formed on the upper surface of the base layer 110. In an embodiment, the inorganic layer may include at least one of aluminum oxide, titanium oxide, silicon oxide, silicon nitride, silicon oxynitride, zirconium oxide, and hafnium oxide. In some embodiments, the inorganic layer may be formed of multiple layers. The multiple inorganic layers may constitute a barrier layer and/or a buffer layer. In an embodiment, the display layer 100 is illustrated as including a buffer layer BFL that is disposed on (e.g., disposed directly thereon in the third direction DR3) the base layer 110.

The buffer layer BFL may increase a bonding force between the base layer 110 and a semiconductor pattern. In an embodiment, the buffer layer BFL may include at least one of silicon oxide, silicon nitride, and silicon oxynitride. For example, in an embodiment the buffer layer BFL may include a structure in which a silicon oxide layer and a silicon nitride layer are alternately stacked (e.g., in the third direction DR3).

The semiconductor pattern may be disposed on the buffer layer BFL. In an embodiment, the semiconductor pattern may include polysilicon. However, embodiments of the present disclosure are not necessarily limited thereto, and the semiconductor pattern may include amorphous silicon, low-temperature polycrystalline silicon, or oxide semiconductor in some embodiments.

FIG. 4 only illustrates a portion of the semiconductor pattern, and the semiconductor pattern may be further disposed in another area. For example, in an embodiment, semiconductor patterns may be arranged across pixels in a specific rule. The semiconductor pattern may have a different electrical property depending on whether the semiconductor pattern is doped or undoped. The semiconductor pattern may include a first area having higher conductivity and a second area having lower conductivity. The first area may be doped with an N-type dopant or a P-type dopant. A P-type transistor may include a doped area doped with a P-type dopant, and an N-type transistor may include a doped area doped with an N-type dopant. The second area may be a non-doped area or an area doped at a lower concentration than the first area.

The conductivity of the first area may be greater than the conductivity of the second area, and the first area may substantially serve as an electrode or a signal line. The second area may substantially correspond to an active (e.g., a channel) of a transistor. For example, a portion of the semiconductor pattern may be an active of a transistor, another portion thereof may be a source or a drain of the transistor, and another portion thereof may be a connection electrode or a connection signal line.

In an embodiment, each of the pixels may have an equivalent circuit including seven transistors, one capacitor, and a light emitting element, and the equivalent circuit diagram of the pixel may be modified in various forms. One transistor 100PC and one light emitting element 100PE included in the pixel are illustrated in FIG. 4 by way of example.

A source area SC, an active area AL, and a drain area DR of the transistor 100PC may be formed from the semiconductor pattern. The source area SC and the drain area DR may extend in opposite directions from the active area AL on a cross-section. A portion of a connection signal line SCL formed from the semiconductor pattern is illustrated in FIG. 4. In an embodiment, the connection signal line SCL may be connected to the drain area DR of the transistor 100PC in a plan view.

A first insulating layer 10 may be disposed on the buffer layer BFL (e.g., disposed directly thereon in the third direction DR3). The first insulating layer 10 may overlap a plurality of pixels in common and may cover the semiconductor pattern. In an embodiment, the first insulating layer 10 may be an inorganic layer and/or an organic layer, and may have a single-layer structure or a multi-layer structure. For example, in an embodiment the first insulating layer 10 may include at least one of aluminum oxide, titanium oxide, silicon oxide, silicon nitride, silicon oxynitride, zirconium oxide, and hafnium oxide. In this embodiment, the first insulating layer 10 may be a single-layer silicon oxide layer. The insulating layer of the circuit layer 120 to be described later as well as the first insulating layer 10 may be an inorganic layer and/or an organic layer, and may have a single-layer structure or a multi-layer structure. The inorganic layer may include at least one of the above-described materials. However, embodiments of the present disclosure are not necessarily limited thereto.

A gate GT of the transistor 100PC is disposed on the first insulating layer 10 (e.g., disposed directly thereon in the third direction DR3). The gate GT may be a part of a metal pattern. The gate GT overlaps the active area AL (e.g., in the third direction DR3). In the process of doping the semiconductor pattern, the gate GT may function as a mask.

A second insulating layer 20 may be disposed on (e.g., disposed directly thereon in the third direction DR3) the first insulating layer 10 and may cover the gate GT. The second insulating layer 20 may overlap the pixels in common (e.g., in the third direction DR3). In an embodiment, the second insulating layer 20 may be an inorganic layer and/or an organic layer, and may have a single-layer structure or a multi-layer structure. For example, the second insulating layer 20 may include at least one of silicon oxide, silicon nitride, and silicon oxy nitride. In this embodiment, the second insulating layer 20 may have a multi-layer structure including a silicon oxide layer and a silicon nitride layer.

A third insulating layer 30 may be disposed on the second insulating layer 20 (e.g., disposed directly thereon in the third direction DR3). The third insulating layer 30 may have a single-layer or a multi-layer structure. In this embodiment, the third insulating layer 30 may have a multi-layer structure including a silicon oxide layer and a silicon nitride layer.

A first connection electrode CNE1 may be disposed on the third insulating layer 30 (e.g., disposed directly thereon in the third direction DR3). In an embodiment, the first connection electrode CNE1 may be connected to the connection signal line SCL through a contact hole CNT-1 penetrating the first, second, and third insulating layers 10, 20, and 30.

A fourth insulating layer 40 may be disposed on the third insulating layer 30 (e.g., disposed directly thereon in the third direction DR3). In an embodiment, the fourth insulating layer 40 may be a single silicon oxide layer. A fifth insulating layer 50 may be disposed on the fourth insulating layer 40 (e.g., disposed directly thereon in the third direction DR3). In an embodiment, the fifth insulating layer 50 may be an organic layer.

A second connection electrode CNE2 may be disposed on the fifth insulating layer 50 (e.g., disposed directly thereon in the third direction DR3). In an embodiment, the second connection electrode CNE2 may be connected to the first connection electrode CNE1 through a contact hole CNT-2 penetrating the fourth insulating layer 40 and the fifth insulating layer 50.

A sixth insulating layer 60 may be disposed on the fifth insulating layer 50 (e.g., disposed directly thereon in the third direction DR3) and may cover the second connection electrode CNE2. In an embodiment, the sixth insulating layer 60 may be an organic layer.

The light emitting element layer 130 may be disposed on the circuit layer 120 (e.g., disposed directly thereon in the third direction DR3). The light emitting element layer 130 may include the light emitting element 100PE. For example, in an embodiment, the light emitting element layer 130 may include an organic light emitting material, an inorganic light emitting material, an organic-inorganic light emitting material, a quantum dot, a quantum rod, a micro-LED, or a nano-LED. Hereinafter, the description will be given for an embodiment in which the light emitting element 100PE is an organic light emitting element. However, embodiments of the present disclosure are not necessarily limited thereto.

The light emitting element 100PE may include a first electrode AE (e.g., an anode electrode), a light emitting layer EL, and a second electrode CE (e.g., a cathode electrode).

The first electrode AE may be disposed on the sixth insulating layer 60 (e.g., disposed directly thereon in the third direction DR3). In an embodiment, the first electrode AE may be connected to the second connection electrode CNE2 through a contact hole CNT-3 penetrating the sixth insulating layer 60.

A pixel defining layer 70 may be disposed on the sixth insulating layer 60 and may cover a portion of the first electrode AE. For example, in an embodiment, the pixel defining layer 70 may cover lateral ends of the first electrode AE and includes an opening 70-OP exposing a central portion of the first electrode AE. The opening 70-OP of the pixel defining layer 70 exposes at least a portion of the first electrode AE.

The active area 1000A (refer to FIG. 1) may include an emission area PXA and a non-emission area NPXA adjacent to the emission area PXA. The non-emission area NPXA may surround the emission area PXA (e.g., in the first and/or second directions DR1, DR2). In the present embodiment, the emission area PXA is defined to correspond to the portion of the first electrode AE, which is exposed by the opening 70-OP.

The light emitting layer EL may be disposed on the first electrode AE (e.g., in the third direction DR3). The light emitting layer EL may be disposed in a region corresponding to the opening 70-OP. For example, in an embodiment the light emitting layer EL may be independently formed for respective pixels. In an embodiment in which the light emitting layers EL are separately formed for respective pixels, each of the light emitting layers EL may emit a light of at least one of a blue color, a red color, and a green color. However, embodiments of the present disclosure are not necessarily limited thereto, and the light emitting layer EL may be connected with the pixels in common in some embodiments. In this case, the light emitting layer EL may provide blue light or white light. However, embodiments of the present disclosure are not necessarily limited thereto and the colors provided by the light emitting layer EL may vary.

The second electrode CE may be disposed on the light emitting layer EL (e.g., in the third direction DR3). In an embodiment, the second electrode CE may be integrally disposed in a plurality of pixels in common.

In an embodiment, a hole control layer may be interposed between the first electrode AE and the light emitting layer EL (e.g., in the third direction DR3). In an embodiment, the hole control layer may be disposed in common in the emission area PXA and the non-emission area NPXA. The hole control layer may include a hole transport layer and may further include a hole injection layer. In an embodiment, an electronic control layer may be disposed between the light emitting layer EL and the second electrode CE (e.g., in the third direction DR3). The electron control layer may include an electron transport layer and may further include an electron injection layer. In an embodiment, the hole control layer and the electron control layer may be formed, in common, in a plurality of pixels by using an open mask.

The encapsulation layer 140 may be disposed on the light emitting element layer 130 (e.g., disposed directly thereon in the third direction DR3). In an embodiment, the encapsulation layer 140 may include an inorganic layer, an organic layer, and an inorganic layer sequentially stacked (e.g., in the third direction DR3). However, embodiments of the present disclosure are not necessarily limited thereto and layers constituting the encapsulation layer 140 may vary.

The inorganic layers may protect the light emitting element layer 130 from moisture and oxygen, and the organic layer may protect the light emitting element layer 130 from a foreign material such as dust particles. In an embodiment, the inorganic layers may include a silicon nitride layer, a silicon oxynitride layer, a silicon oxide layer, a titanium oxide layer, or an aluminum oxide layer. The organic layer may include, but is not necessarily limited to, an acrylic-based organic layer.

In an embodiment, the sensor layer 200 may include a sensor base layer 201, a first conductive layer 202, a sensing insulating layer 203, a second conductive layer 204, and a cover insulating layer 205.

In an embodiment, the sensor base layer 201 may be an inorganic layer including at least one of silicon nitride, silicon oxy nitride, and silicon oxide. Alternatively, the sensor base layer 201 may be an organic layer including an epoxy resin, an acrylate resin, or an imide-based resin. The sensor base layer 201 may have a single-layer structure or may have a multi-layer structure stacked in the third direction DR3.

Each of the first conductive layer 202 and the second conductive layer 204 may have a single-layer structure or a multi-layer structure in which a plurality of layers are stacked along the third direction DR3.

Each of the first conductive layer 202 and the second conductive layer 204 of a single-layer structure may include a metal layer or a transparent conductive layer. In an embodiment, the metal layer may include molybdenum, silver, titanium, copper, aluminum, or the alloy thereof. The transparent conductive layer may include a transparent conductive oxide such as indium tin oxide (ITO), indium zinc oxide (IZO), zinc oxide (ZnO), or indium zinc tin oxide (IZTO), etc. In addition, the transparent conductive layer may include a conductive polymer such as PEDOT, metal nanowires, graphene, etc.

Each of the first conductive layer 202 and the second conductive layer 204 of the multi-layer structure may include metal layers. In an embodiment, the metal layers may, for example, have a three-layer structure of titanium/ aluminum/titanium. The multi-layered conductive layer may include at least one metal layer and at least one transparent conductive layer.

At least one of the sensing insulating layer 203 and the cover insulating layer 205 may include an inorganic film. In an embodiment, the inorganic film may include at least one of aluminum oxide, titanium oxide, silicon oxide, silicon nitride, silicon oxynitride, zirconium oxide, and hafnium oxide.

At least one of the sensing insulating layer 203 and the cover insulating layer 205 may include an organic film. In an embodiment, the organic film may include at least one of acrylic resin, methacrylic resin, polyisoprene, vinyl-based resin, epoxy-based resin, urethane-based resin, cellulose-based resin, siloxane-based resin, polyimide-based resin, polyamide-based resin, and perylene-based resin.

Figure 5:
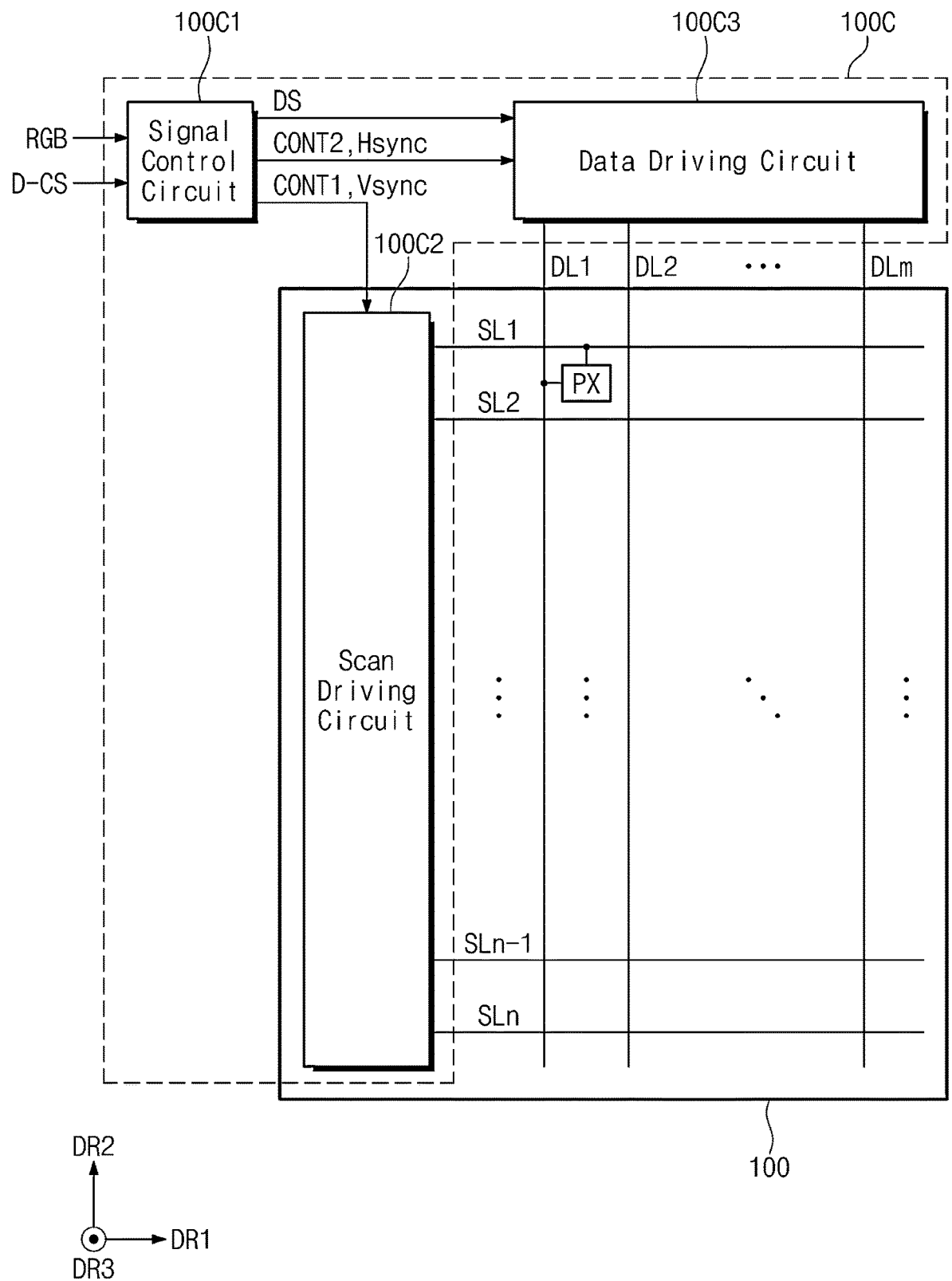
FIG. 5 is a block diagram illustrating a display layer and a display driver, according to an embodiment of the present disclosure.

FIG. 5 is a block diagram illustrating the display layer 100 and the display driver 100C, according to an embodiment of the present disclosure.

Referring to FIG. 5, in an embodiment the display layer 100 may include a plurality of scan lines SL1 to SLn (where, 'n' is an integer of two or more), a plurality of data lines DL1 to DLm (where, 'm' is an integer of two or more), and a plurality of pixels PX. Each of the plurality of pixels PX is connected with a corresponding data line of the plurality of data lines DL1 to DLm and may be connected with a corresponding scan line of the plurality of scan lines SL1 to SLn. In an embodiment of the present disclosure, the display layer 100 may further include light emission control lines, and the display driver 100C may further include a light emission driving circuit that provides control signals to the light emission control lines. However, embodiments of the present disclosure are not necessarily limited thereto and the configuration of the display layer 100 may vary.

In an embodiment, each of the plurality of scan lines SL1 to SLn may extend in the first direction DR1, and the plurality of scan lines SL1 to SLn may be arranged to be spaced apart from each other in the second direction DR2. Each of the plurality of data lines DL1 to DLm may extend in the second direction DR2, and the plurality of data lines DL1 to DLm may be arranged to be spaced from each other in the first direction DR1.

In an embodiment, the display driver 100C may include a signal control circuit 100C1, a scan driving circuit 100C2, and a data driving circuit 100C3.

The signal control circuit 100C1 may receive the image data RGB and the control signal D-CS from the main driver 1000C (refer to FIG. 2). The control signal D-CS may include various signals.

The signal control circuit 100C1 may generate a first control signal CONT1 and a vertical synchronization signal Vsync based on the control signal D-CS, and may output the first control signal CONT1 and the vertical synchronization signal Vsync to the scan driving circuit 100C2. The vertical synchronization signal Vsync may be included in the first control signal CONT1.

In an embodiment, the signal control circuit 100C1 may generate a second control signal CONT2 and a horizontal synchronization signal Hsync based on the control signal D-CS, and may output the second control signal CONT2 and the horizontal synchronization signal Hsync to the data driving circuit 100C3. The horizontal synchronization signal Hsync may be included in the second control signal CONT2.

In addition, the signal control circuit 100C1 may output a driving signal DS obtained by processing the image data RGB to match to the operating condition of the display layer 100 to the data driving circuit 100C3. The first control signal CONT1 and the second control signal CONT2 are signals for the operation of the scan driving circuit 100C2 and the data driving circuit 100C3. However, embodiments of the present disclosure are not necessarily limited thereto.

The scan driving circuit 100C2 drives the plurality of scan lines SL1 to SLn in response to the first control signal CONT1 and the vertical synchronization signal Vsync. In an embodiment of the present disclosure, the scan driving circuit 100C2 may be formed in the same process as the circuit layer 120 (refer to FIG. 4) in the display layer 100. However, embodiments of the present disclosure are not necessarily limited thereto. For example, the scan driving circuit 100C2 may be implemented as an integrated circuit (IC) and may be directly mounted on a predetermined area of the display layer 100 or may be mounted on a separate printed circuit board in a chip-on-film (COF) manner, to be electrically connected with the display layer 100.

In an embodiment, the data driving circuit 100C3 may output a grayscale voltage to the plurality of data lines DL1 to DLm in response to the second control signal CONT2, the horizontal synchronization signal Hsync, and the driving signal DS from the signal control circuit 100C1. The data driving circuit 100C3 may be implemented as an integrated circuit and may be directly mounted on a predetermined area of the display layer 100 or may be mounted on a separate printed circuit board in a chip-on-film manner, to be electrically connected to the display layer 100, but is not particular limited thereto. For example, in an embodiment the data driving circuit 100C3 may be formed in the same process as the circuit layer 120 (refer to FIG. 4) in the display layer 100.

Figure 6:
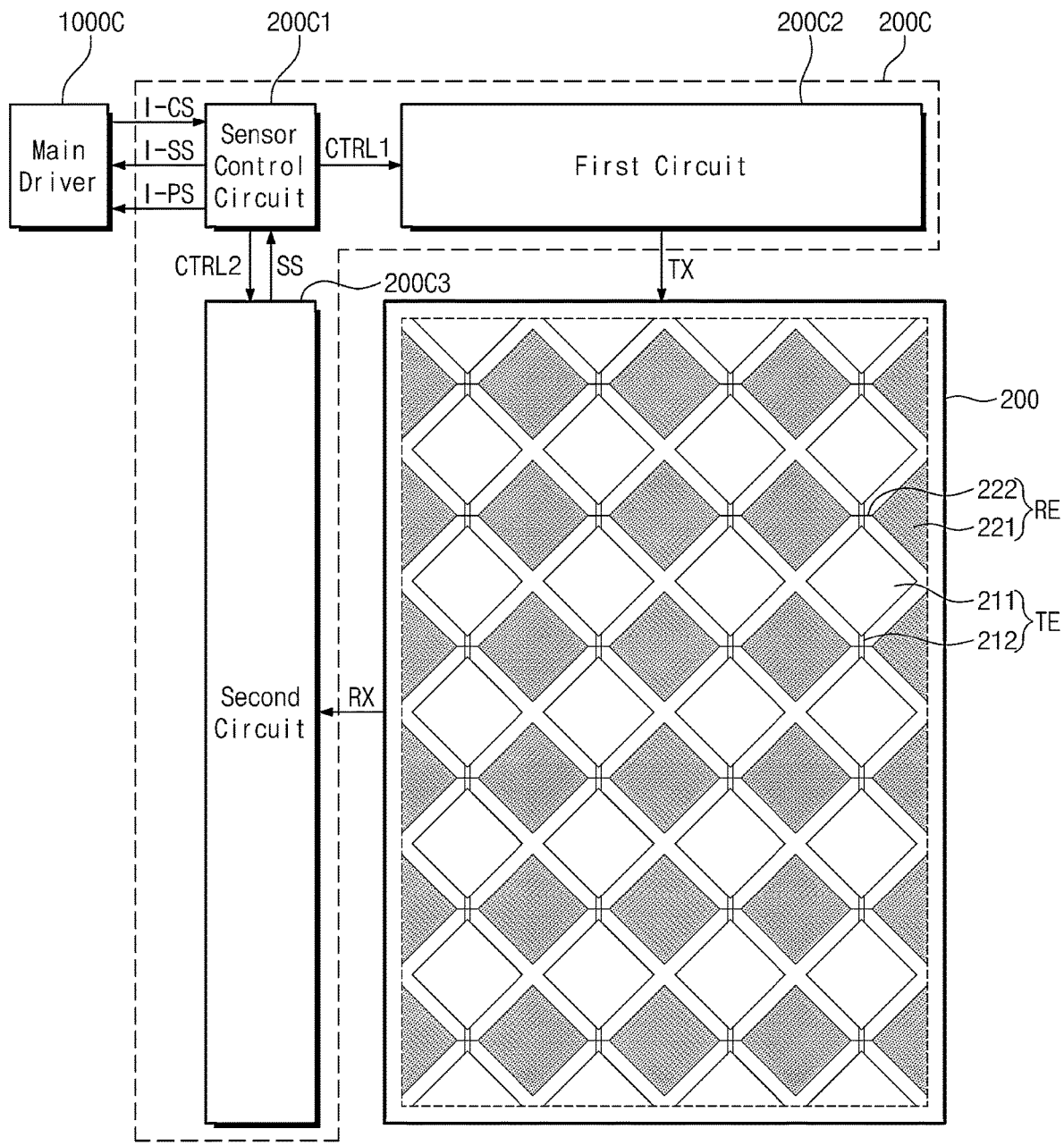
FIG. 6 is a block diagram of an input sensor, according to an embodiment of the present disclosure.

FIG. 6 is a block diagram of an input sensor, according to an embodiment of the present disclosure.

Referring to FIG. 6, the input sensor includes the sensor layer 200 and the sensor driver 200C.

In an embodiment, the sensor layer 200 may include a plurality of first electrodes TE and a plurality of second electrodes RE. Each of the plurality of second electrodes RE may intersect the plurality of first electrodes TE. In some embodiments, the sensor layer 200 may further include a plurality of signal lines connected to the plurality of first electrodes TE and the plurality of second electrodes RE.

In an embodiment, each of the plurality of first electrodes TE may extend in the second direction DR2, and the plurality of first electrodes TE may be arranged to be spaced apart from each other in the first direction DR1. Each of the plurality of second electrodes RE may extend in the first direction DR1, and the plurality of second electrodes RE may be arranged to be spaced apart from each other in the second direction DR2.

In an embodiment, each of the plurality of first electrodes TE may include a sensing pattern 211 and a bridge pattern 212. The two sensing patterns 211 adjacent to each other (e.g., in the second direction DR2) may be electrically connected to each other by the two bridge patterns 212. However, embodiments of the present disclosure are not necessarily limited thereto. In an embodiment, the sensing pattern 211 may be included in the second conductive layer 204 (refer to FIG. 4), and the bridge pattern 212 may be included in the first conductive layer 202 (refer to FIG. 4). However, embodiments of the present disclosure are not necessarily limited thereto.

In an embodiment, each of the plurality second electrodes RE may include a first portion 221 and a second portion 222. In an embodiment, the first portion 221 and the second portion 222 may have an integral shape together with each other and may be disposed on the same layer as each other. For example, the first portion 221 and the second portion 222 may be included in the second conductive layer 204 (refer to FIG. 4). The two bridge patterns 212 may insulate and cross the second portion 222.

In an embodiment, the sensor driver 200C may selectively operate in a touch sensing mode that senses the touch input 2000 or a proximity sensing mode that senses whether the object 3000 has approached (e.g., is in proximity or hovers). In an embodiment, the proximity sensing mode may include a first proximity sensing mode or a second proximity sensing mode. In an embodiment, the sensor driver 200C may selectively operate in a touch sensing mode, a first proximity sensing mode, and a second proximity sensing mode.

In an embodiment, the display device 1000 may be a mobile phone. However, embodiments of the present disclosure are not necessarily limited thereto. In an embodiment in which the display device 1000 is a mobile phone, when the display device 1000 is on a call, such as in call mode, the user brings the display device 1000 in proximity to the user's ear. In this case, when the user's body (e.g., ears, cheeks, etc.) directly contacts the display device 1000, the sensor driver 200C may sense the touch. Such abnormal touch sensing may cause unwanted operation of the display device 1000.

When the display device 1000 enters the call mode, the sensor driver 200C determines whether the user's body, that is, the object 3000, has approached closely (e.g., is in close proximity). In an embodiment, when the object 3000 has approached closely, the main driver 1000C may prevent malfunction of the display device 1000 by not allowing images to be displayed on the display layer 100.

The main driver 1000C may control the sensor driver 200C to operate in the first proximity sensing mode or the second proximity sensing mode when entering the call mode.

The sensor driver 200C may receive the control signal I-CS from the main driver 1000C (refer to FIG. 2). In the touch sensing mode, the sensor driver 200C may provide the coordinate signal I-SS to the main driver 1000C (refer to FIG. 2). In the first proximity sensing mode, the sensor driver 200C may provide the proximity signal I-PS generated by the approach of the object 3000 (refer to FIG. 2) that is spaced from the display device 1000 to the main driver 1000C (refer to FIG. 2). In the second proximity sensing mode, the sensor driver 200C may provide the proximity signal I-PS generated by the approach of the object 3000 that is spaced from the display device 1000 (refer to FIG. 2) to the main driver 1000C (refer to FIG. 2).

In an embodiment, the sensor driver 200C is implemented as an integrated circuit (IC) and is directly mounted on a predetermined area of the sensor layer 200 or on a separate printed circuit board in a chip-on-film (COF) manner to be electrically connected to the sensor layer 200.

In an embodiment, the sensor driver 200C may include a sensor control circuit 200C1, a first circuit 200C2, and a second circuit 200C3. The sensor control circuit 200C1 may generate signals CTRL1 and CTRL2 to control operations of the first circuit 200C2 and the second circuit 200C3 based on the control signal I-CS.

The first circuit 200C2 may output transmission signals TX to the sensor layer 200. In an embodiment, the first circuit 200C2 may output the transmission signals TX to the first electrodes TE of the sensor layer 200. The second circuit 200C3 may receive sensing signals RX from the sensor layer 200. For example, the second circuit 200C3 may receive the sensing signals RX from the second electrodes RE of the sensor layer 200.

In an embodiment, the second circuit 200C3 may convert the sensing signals RX, which are analog signals, into digital signals. For example, the second circuit 200C3 amplifies and then filters the sensing signals RX, which are analog signals. For example, the second circuit 200C3 may convert the filtered signal into a digital signal. The second circuit 200C3 provides a coordinate sensing signal SS as a digital signal to the sensor control circuit 200C1.

Figure 7:
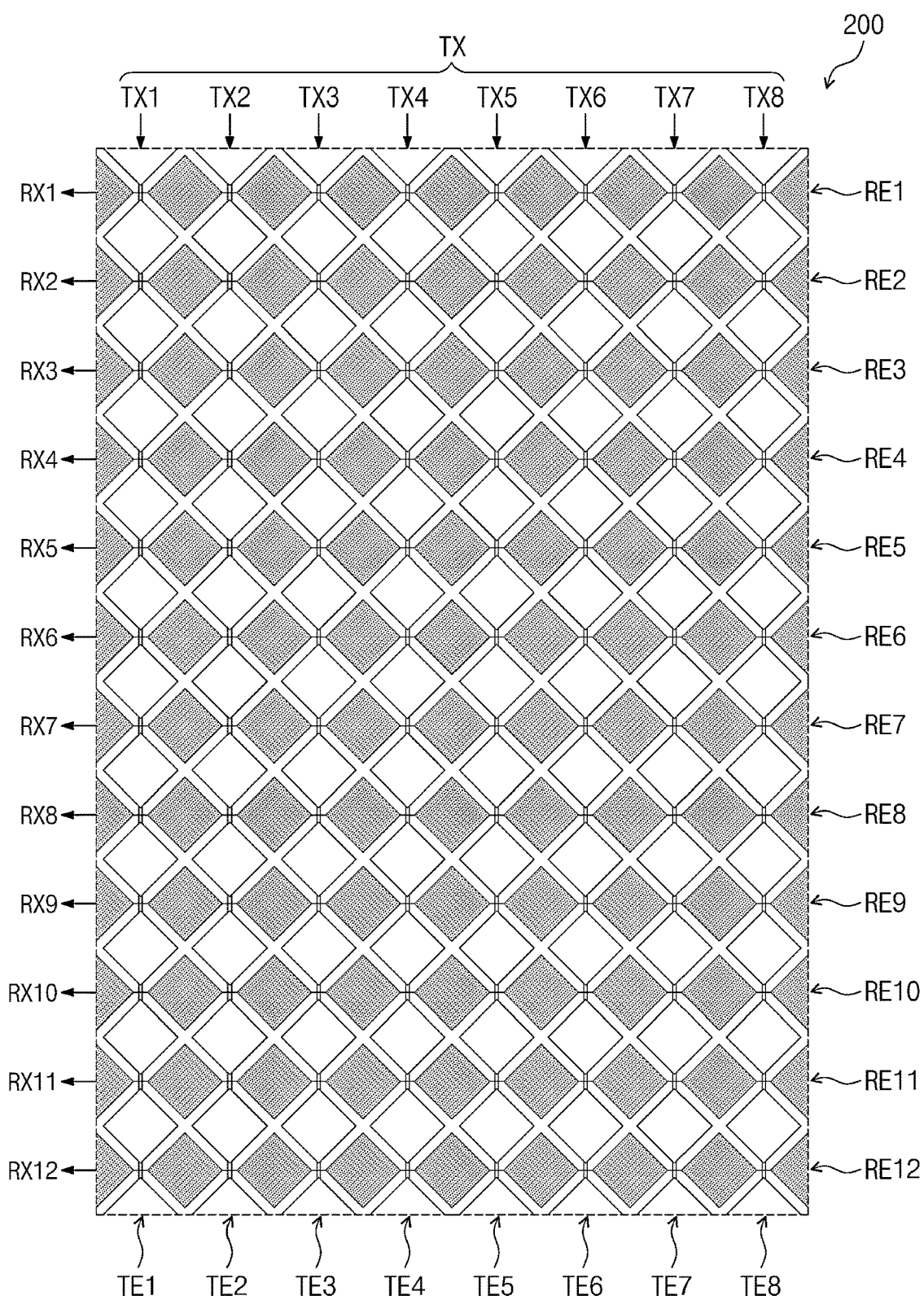
FIG. 7 is a diagram illustrating an operation of a sensor layer when a sensor driver operates in a touch sensing mode according to an embodiment of the present disclosure.
Figure 8:
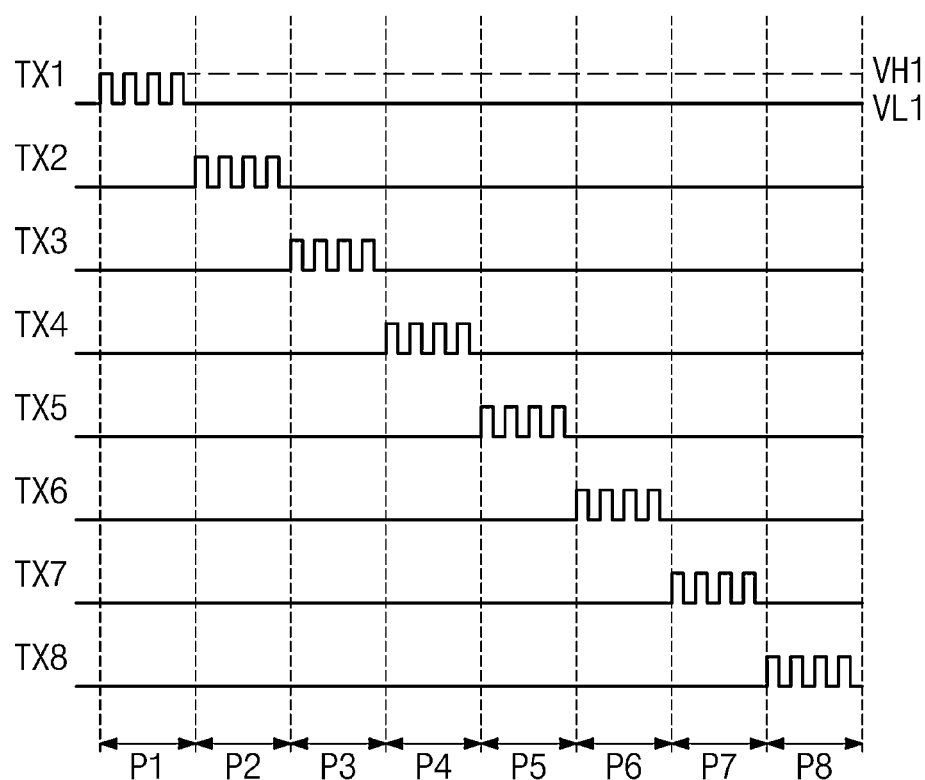
FIG. 8 is a diagram illustrating transmission signals when a sensor driver operates in a touch sensing mode according to an embodiment of the present disclosure.

FIG. 7 is a diagram illustrating an operation of the sensor layer 200 when the sensor driver 200C operates in the touch sensing mode. FIG. 8 is a diagram illustrating transmission signals TX1 to TX8 when the sensor driver 200C operates in the touch sensing mode.

Although FIG. 7 illustrates the sensor layer 200 as an example including eight first electrodes TE1 to TE8 and 12 second electrodes RE1 to RE12, embodiments of the present disclosure are not necessarily limited thereto and the number of the first electrodes TE1 to TE8 and the second electrodes RE1 to RE12 may be changed in various ways.

Referring to FIGS. 6, 7, and 8, in an embodiment, in the touch sensing mode, the first circuit 200C2 of the sensor driver 200C outputs the transmission signals TX1 to TX8 to the first electrodes TE1 to TE8, respectively.

In an embodiment, the transmission signals TX1 to TX8 may sequentially transition to an active level in first to eighth sections P1 to P8. For example, in an embodiment as shown in FIG. 8, the transmission signal TX1 may be a pulse signal that periodically swings (e.g., changes) between a first high level VH1 and a first low level VL1 during the first section P1, and the transmission signal TX2 may be a pulse signal that periodically swings between the first high level VH1 and the first low level VL1 during the second section P2.

However, the waveforms of the transmission signals TX1 to TX8 illustrated in FIG. 8 are only examples, and embodiments of the present disclosure are not necessarily limited thereto. For example, in some embodiments the transmission signals TX1 to TX8 may be maintained at the first high level VH1 in the first to eighth sections P1 to P8, respectively.

The sensor driver 200C may receive sensing signals RX1 to RX12 from the second electrodes RE1 to RE12, respectively. The second circuit 200C3 of the sensor driver 200C outputs the coordinate sensing signal SS corresponding to the sensing signals RX1 to RX12 to the sensor control circuit 200C1. The sensor control circuit 200C1 of the sensor driver 200C may output the coordinate signal I-SS corresponding to the coordinate sensing signal SS to the main driver 1000C during the touch sensing mode.

Figure 9:
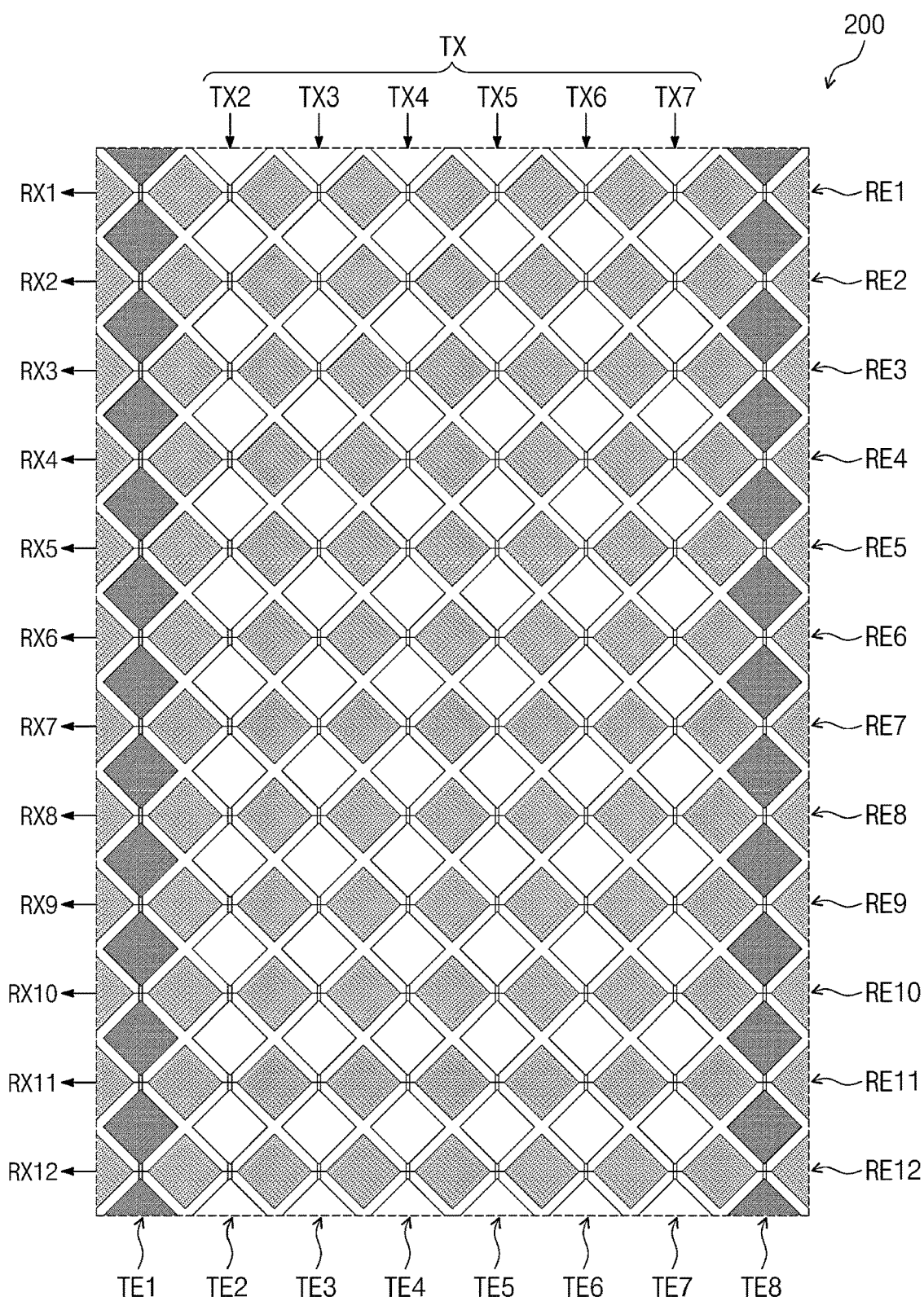
FIG. 9 is a diagram illustrating an operation of a sensor layer when a sensor driver operates in a first proximity sensing mode according to an embodiment of the present disclosure.
Figure 10:
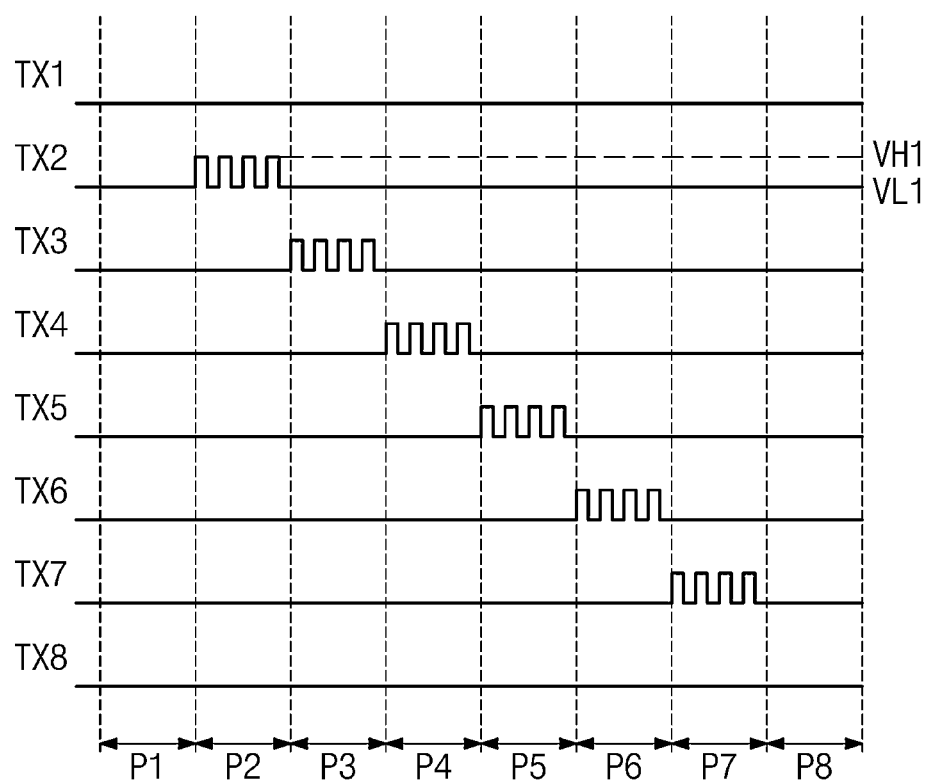
FIG. 10 is a diagram illustrating transmission signals when a sensor driver operates in a first proximity sensing mode according to an embodiment of the present disclosure.

FIG. 9 is a diagram illustrating an operation of the sensor layer 200 when the sensor driver 200C operates in the first proximity sensing mode. FIG. 10 is a diagram illustrating the transmission signals TX1 to TX8 when the sensor driver 200C operates in the first proximity sensing mode.

Referring to FIGS. 6, 9, and 10, in an embodiment, in the first proximity sensing mode, the first circuit 200C2 of the sensor driver 200C outputs transmission signals only to some of the first electrodes TE1 to TE8. In the examples illustrated in FIGS. 9 and 10, the sensor driver 200C outputs the transmission signals TX2 to TX7 only to the first electrodes TE2 to TE7 among the first electrodes TE1 to TE8, respectively. However, embodiments of the present disclosure are not necessarily limited thereto.

In an embodiment, the transmission signals TX2 to TX7 may sequentially transition to the active level in the second to seventh sections P2 to P7. For example, the transmission signal TX2 may be a pulse signal that periodically swings between the first high level VH1 and the first low level VL1 during the second section P2, and the transmission signal TX3 may be a pulse signal that periodically swings between the first high level VH1 and the first low level VL1 during the third section P3.

In an embodiment, the transmission signals TX2 to TX7 may have the same waveform as the transmission signals TX2 to TX7 in the touch sensing mode illustrated in FIG. 8.

The waveforms of the transmission signals TX2 to TX7 illustrated in FIG. 10 are only examples, and embodiments of the present disclosure are not necessarily limited thereto. For example, in an embodiment the transmission signals TX2 to TX7 may be maintained at the first high level VH1 in the second to seventh sections P2 to P7, respectively.

In an embodiment, each of the first electrodes TEL and TE8 may be in a non-driven state during the first proximity sensing mode. In an embodiment, during the first proximity sensing mode, the sensor driver 200C may output the transmission signals TX1 and TX8 of the first low level VL1 to the first electrodes TE1 and TE8, respectively.

The sensor driver 200C may receive the sensing signals RX1 to RX12 from the second electrodes RE1 to RE12, respectively. The sensor driver 200C may output the proximity signal I-PS corresponding to the sensing signals RX1 to RX12 to the main driver 1000C during the first proximity sensing mode.

The first electrodes TE1 and TE8 corresponding to the edge area of the display device 1000 may be unnecessary in determining whether the object 3000 (refer to FIG. 2) has approached. In addition, the edge area of the display device 1000 may provide incorrect information unrelated to whether the object 3000 (refer to FIG. 2) has approached due to the user's grip.

Therefore, in the first proximity sensing mode, the sensor driver 200C may not output transmission signals to the first electrodes TE1 and TE8 comprising a pulse signal that periodically swings between the first high level VH1 and the first low level VL1. Power consumption may be reduced by not outputting these transmission signals to the first electrodes TE1 and TE8.

Figure 11A:
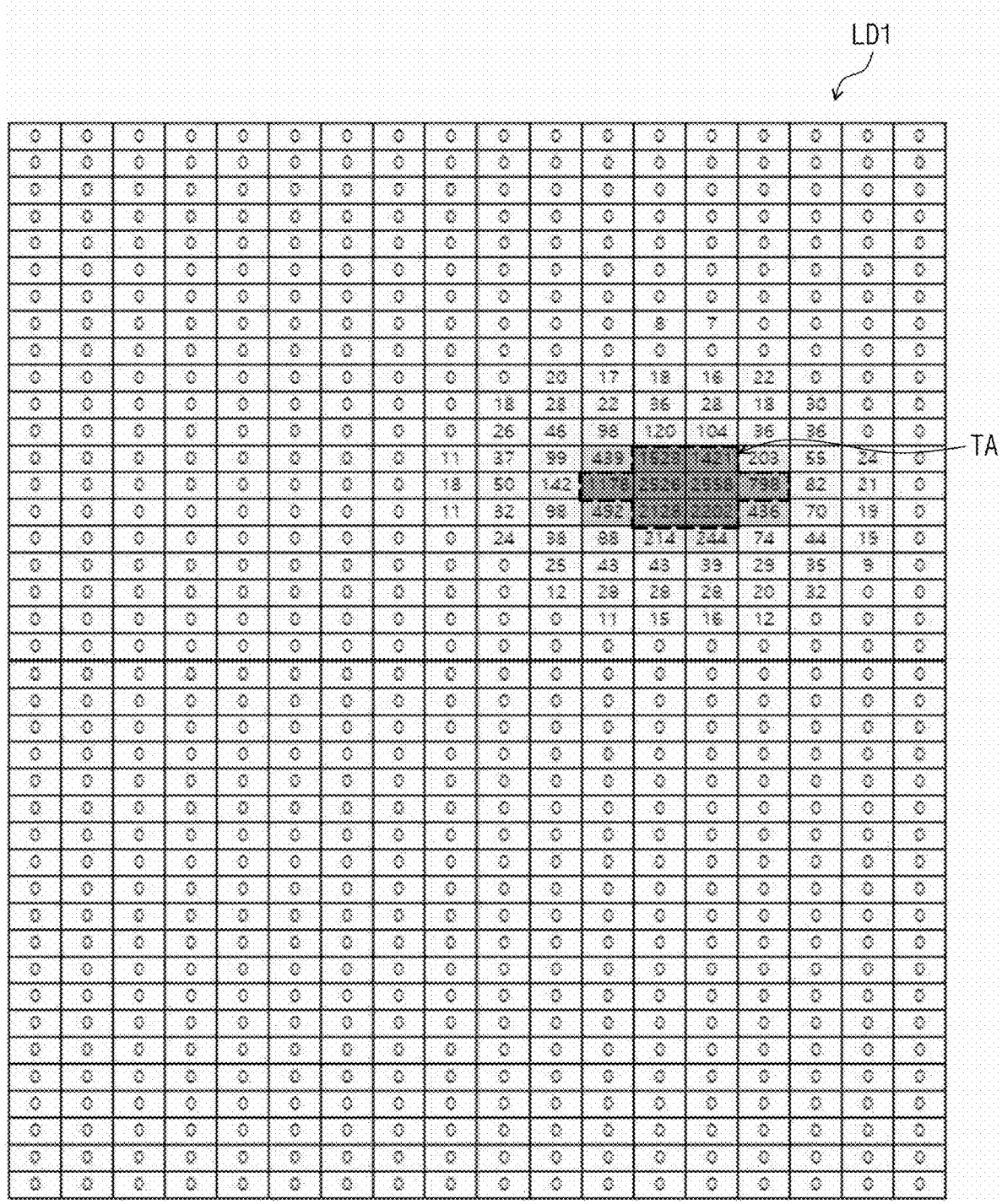
FIG. 11A is a diagram illustrating first raw data generated when a touch input by a user's touch is sensed according to an embodiment of the present disclosure.

FIG. 11A is a diagram illustrating first raw data LD1 generated when the touch input 2000 by a user's touch is sensed.

Referring to FIG. 11A, in an embodiment, the first raw data LD1 generated when the touch input 2000 is sensed may be obtained by converting the sensing signals RX (refer to FIG. 6), which are analog signals, into digital signals. A portion corresponding to a value greater than or equal to a reference value (e.g., 500) among the first raw data LD1 may be regarded as a touch area TA.

Figure 11B:
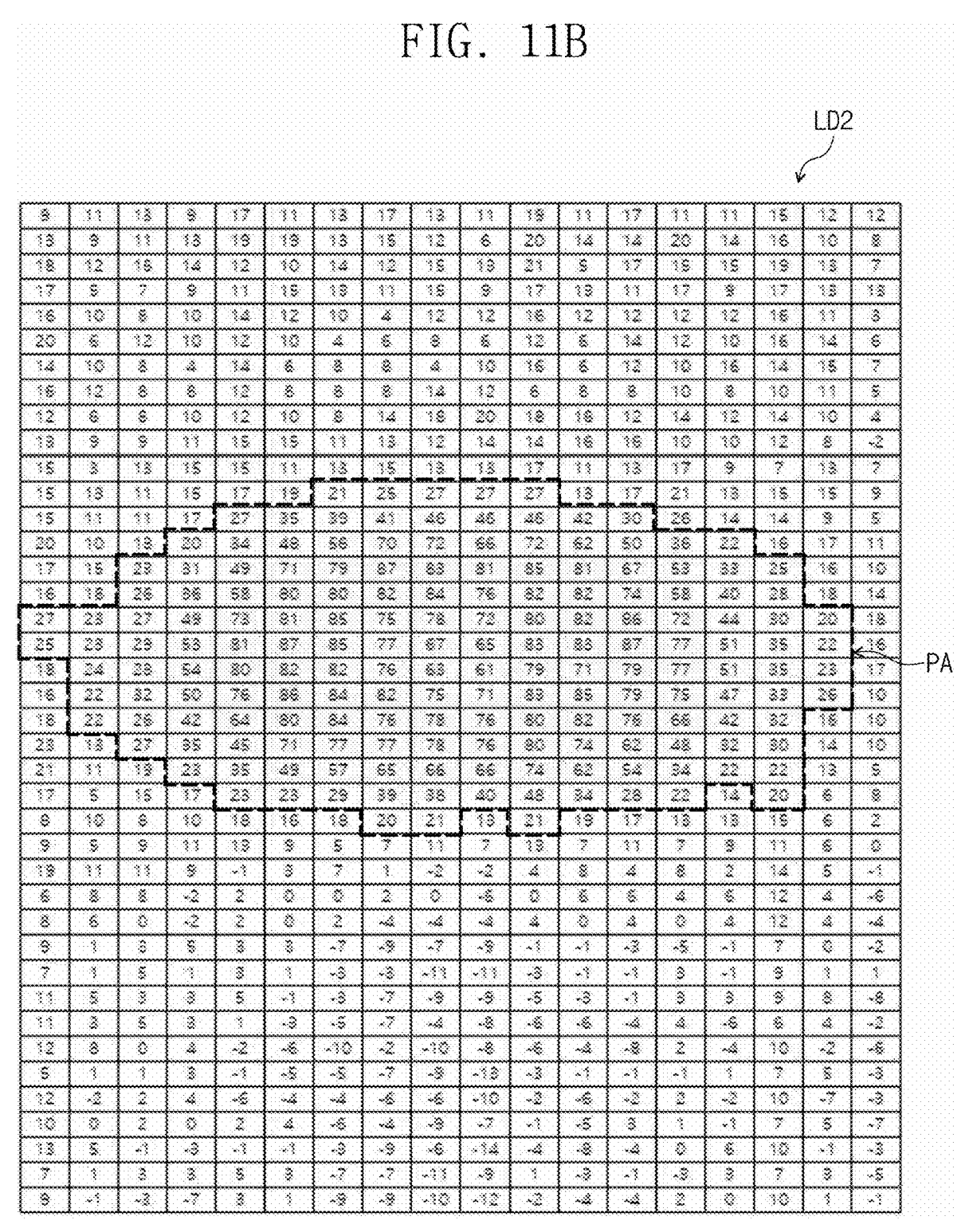

FIG. 11B is a diagram illustrating second raw data LD2 generated when the proximity of the object 3000, such as the user's body, is sensed.

Referring to FIG. 11B, in an embodiment, the second raw data LD2 generated when the proximity of the object 3000 is sensed may be obtained by converting the sensing signals RX (refer to FIG. 6), which are analog signals, into digital signals. A portion corresponding to a value greater than or equal to a reference value (e.g., 20) among the second raw data LD2 may be regarded as a proximity area PA.

Comparing FIGS. 11A and 11B, the digital signal in the touch area TA has a relatively high value (e.g., 500 or more, such as a range of 798 to 2558), and the digital signal in the proximity area PA has a relatively low value (e.g., 20 or more, such as a range of 20 to 87). In addition, the area of the proximity area PA is larger than the area of the touch area TA.

As illustrated in FIG. 2, when the object 3000 approaches the surface 1000SF of the display device 1000, the digital signal in the proximity area PA of the second raw data LD2 has a relatively low value, so it may be difficult to accurately sense whether the object 3000 has approached the display device 1000.

Figure 12:
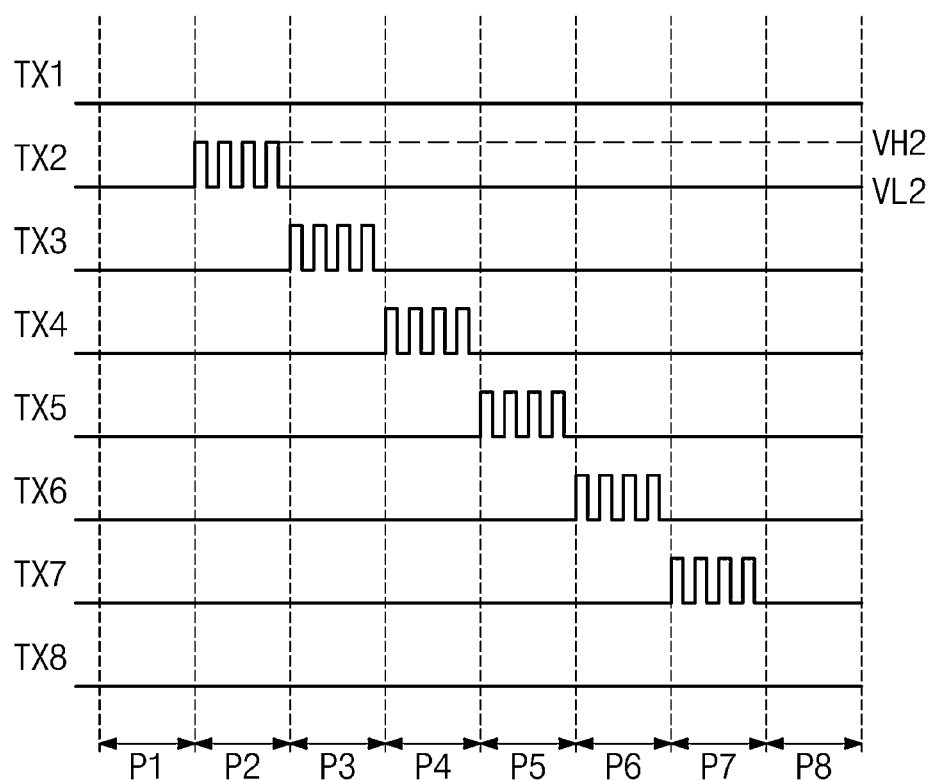
FIG. 12 is a diagram illustrating transmission signals when a sensor driver operates in a second proximity sensing mode according to an embodiment of the present disclosure.

FIG. 12 is a diagram illustrating transmission signals TX1 to TX8 when the sensor driver 200C operates in the second proximity sensing mode.

Referring to FIGS. 6, 9, and 12, in the second proximity sensing mode, the sensor driver 200C outputs transmission signals only to some of the first electrodes TE1 to TE8. In the examples illustrated in FIGS. 9 and 12, the sensor driver 200C outputs the transmission signals TX2 to TX7 only to the first electrodes TE2 to TE7 among the first electrodes TE1 to TE8, respectively.

In an embodiment, the transmission signals TX2 to TX7 may sequentially transition to the active level in the second to seventh sections P2 to P7. For example, in an embodiment the transmission signal TX2 may be a pulse signal that periodically swings between a second high level VH2 and a second low level VL2 during the second section P2, and the transmission signal TX3 may be a pulse signal that periodically swings between the second high level VH2 and the second low level VL2 during the third section P3.

The waveforms of the transmission signals TX2 to TX7 illustrated in FIG. 12 are only an example, and embodiments of the present disclosure are not necessarily limited thereto. For example, in an embodiment the transmission signals TX2 to TX7 may be maintained at the second high level VH2 in the second to seventh sections P2 to P7, respectively.

In an embodiment, each of the first electrodes TEL and TE8 may be in a non-driven state during the second proximity sensing mode. In an embodiment, during the second proximity sensing mode, the sensor driver 200C may output the transmission signals TX1 and TX8 of the second low level VL2 to the first electrodes TE1 and TE8, respectively.

The sensor driver 200C may receive the sensing signals RX1 to RX12 from the second electrodes RE1 to RE12, respectively. The sensor driver 200C may output the proximity signal I-PS corresponding to the sensing signals RX1 to RX12 to the main driver 1000C during the second proximity sensing mode.

In an embodiment, the transmission signals TX2 to TX7 may be pulse signals that swing between the second high level VH2 and the second low level VL2.

In an embodiment, the second low level VL2 may be the same voltage level as the first low level VL1 illustrated in FIG. 10, and the second high level VH2 may be a voltage level higher than the first high level VH1 illustrated in FIG. 10.

For example, the amplitude of each of the transmission signals TX2 to TX7 in the second proximity sensing mode may be greater than the amplitude of each of the transmission signals TX2 to TX7 in the first proximity sensing mode illustrated in FIG. 10.

As the voltage level of the second high level VH2 increases in the second proximity sensing mode, as illustrated in FIG. 2, when the object 3000 approaches the surface 1000SF of the display device 1000, the capacitance between the first electrodes TE2 to TE7 and the second electrodes RE1 to RE12 may increase. Therefore, the proximity sensing performance of the sensor driver 200C may be increased.

Figure 13:
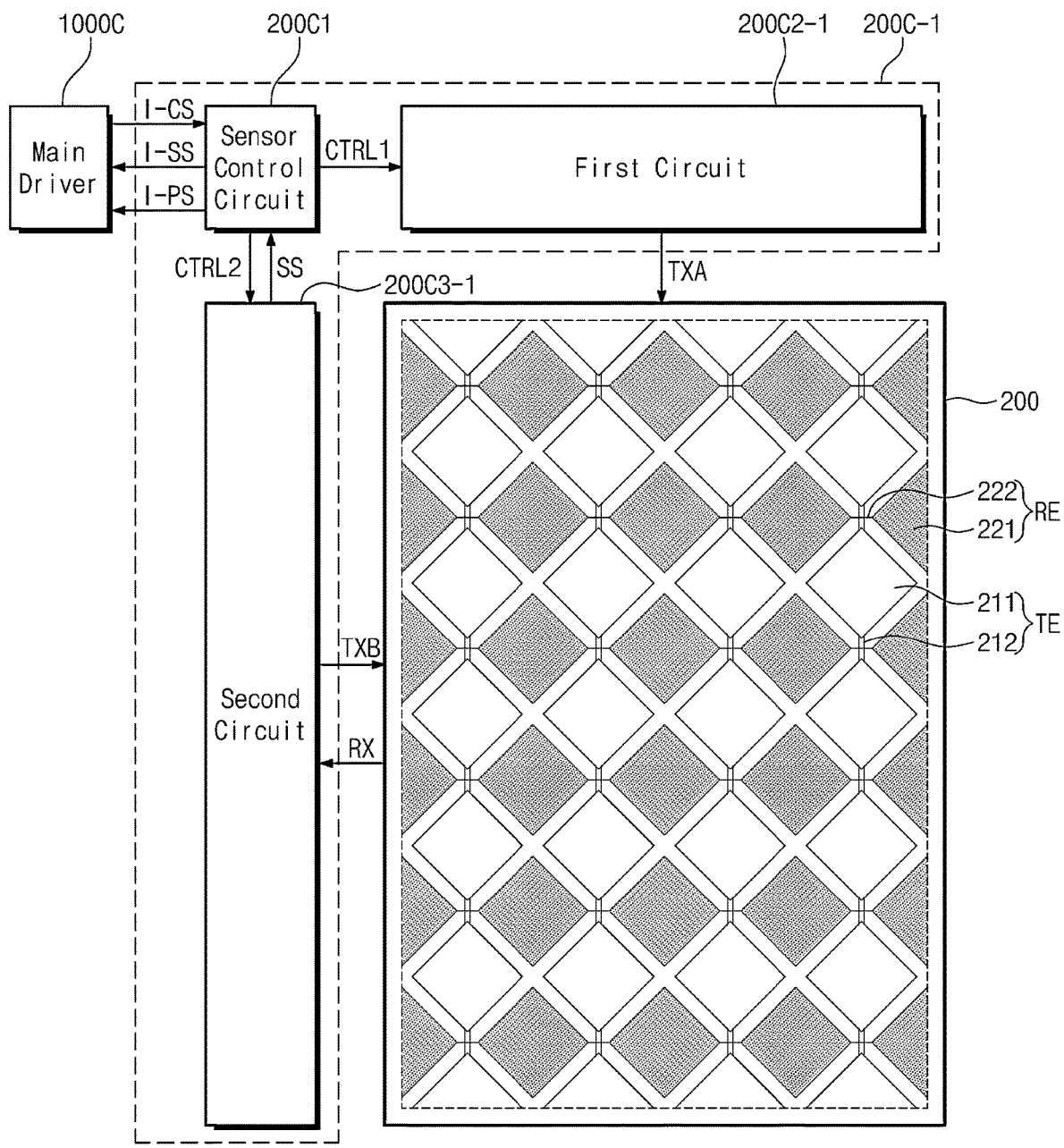
FIG. 13 is a block diagram illustrating a sensor layer and a sensor driver, according to an embodiment of the present disclosure.

FIG. 13 is a block diagram of the sensor layer 200 and a sensor driver 200C-1 according to an embodiment of the present disclosure.

Among the configurations of the sensor layer 200 and the sensor driver 200C-1 illustrated in FIG. 13, the same reference numerals are used for the same configurations as the sensor layer 200 and the sensor driver 200C illustrated in FIG. 6, and additional description will be omitted to avoid redundancy.

Referring to FIG. 13, the sensor driver 200C-1 may selectively operate in the touch sensing mode that senses the touch input 2000 or the proximity sensing mode that senses whether the object 3000 has approached the surface 1000SF of the display device 1000. In an embodiment, the proximity sensing mode may include the first proximity sensing mode or the second proximity sensing mode. For example, the sensor driver 200C-1 may selectively operate in the touch sensing mode, the first proximity sensing mode, and the second proximity sensing mode.

During the second proximity sensing mode, a first circuit 200C2-1 of the sensor driver 200C-1 may output first transmission signals TXA to the sensor layer 200.

During the second proximity sensing mode, a second circuit 200C3-1 of the sensor driver 200C-1 may output second transmission signals TXB to the sensor layer 200 and may receive the sensing signals RX from the sensor layer 200.

Figure 14:
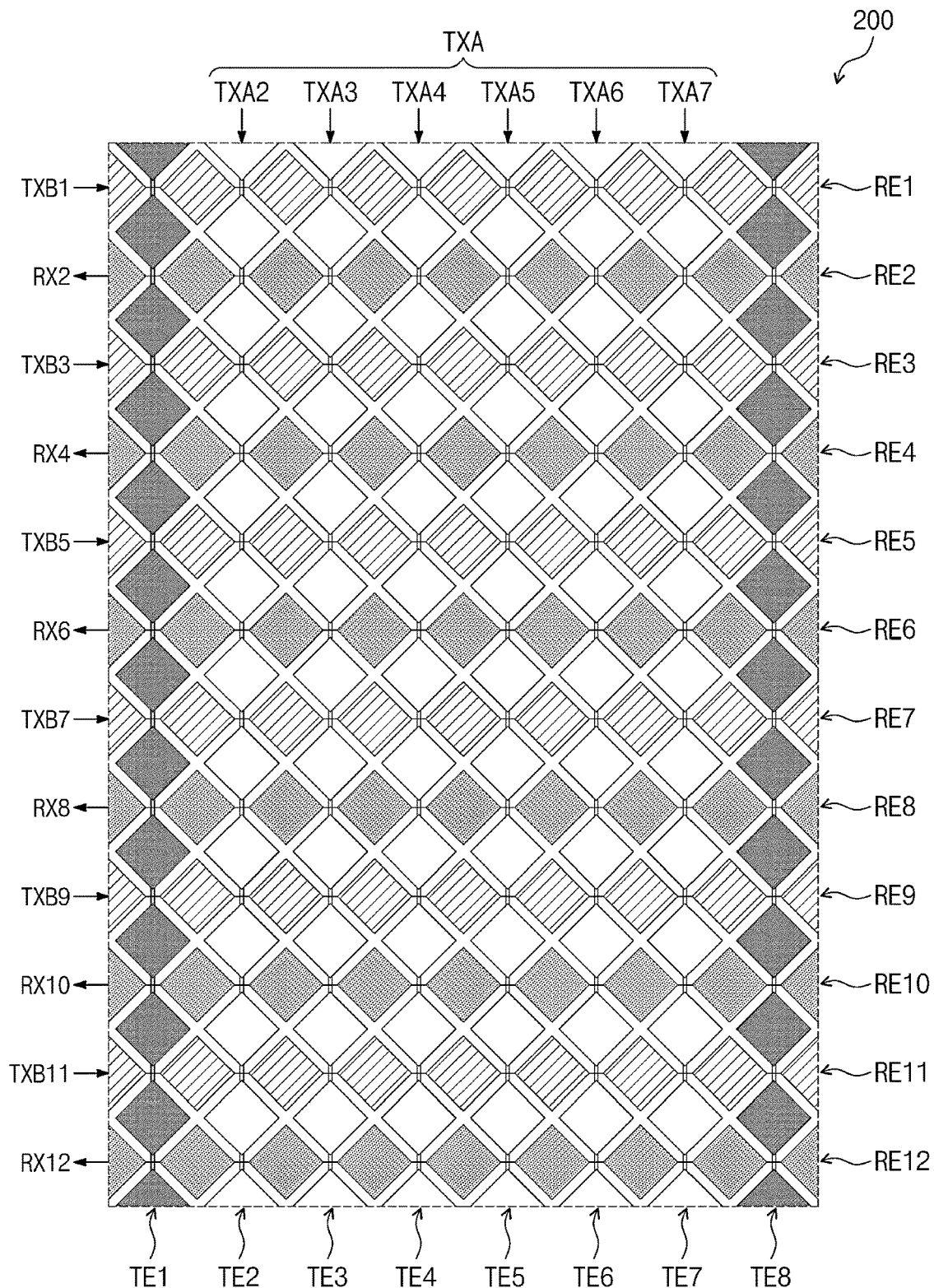
FIG. 14 is a diagram illustrating an operation of a sensor layer when a sensor driver operates in a second proximity sensing mode according to an embodiment of the present disclosure.
Figure 15:
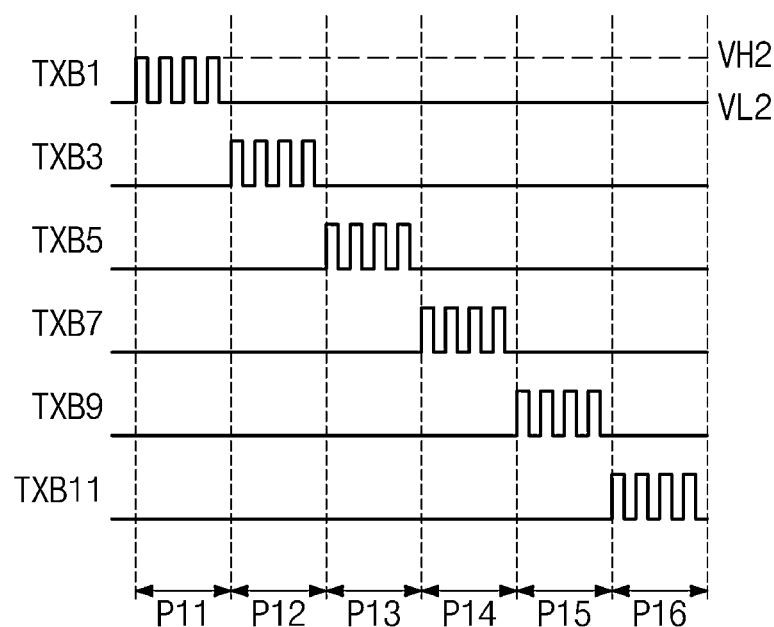
FIG. 15 is a diagram illustrating second transmission signals when a sensor driver operates in a second proximity sensing mode according to an embodiment of the present disclosure.

Referring to FIG. 14 is a diagram illustrating an operation of the sensor layer 200 when the sensor driver 200C-1 operates in the second proximity sensing mode. FIG. 15 is a diagram illustrating second transmission signals TXB1, TXB3, TXB5, TXB7, TXB9, and TXB11 when the sensor driver 200C-1 operates in the second proximity sensing mode.

FIGS. 14 and 15, in the second proximity sensing mode, the first circuit 200C2-1 of the sensor driver 200C-1 outputs first transmission signals only to some of the first electrodes TE1 to TE8. In the example illustrated in FIG. 14, the sensor driver 200C outputs the first transmission signals TXA2 to TXA7 only to the first electrodes TE2 to TE7 among the first electrodes TE1 to TE8, respectively. In an embodiment, the waveforms of the first transmission signals TXA2 to TXA7 may be the same as the transmission signals TX2 to TX7 illustrated in FIG. 12.

In an embodiment, each of the first electrodes TEL and TE8 may be in a non-driven state during the second proximity sensing mode. In an embodiment, during the second proximity sensing mode, the sensor driver 200C-1 may output the transmission signals TX1 and TX8 of the second low level VL2 to the first electrodes TE1 and TE8, respectively.

In the second proximity sensing mode, the second circuit 200C3-1 of the sensor driver 200C-1 may output the second transmission signal TXB to second electrodes of a first group among the second electrodes RE1 to RE12, and may receive the sensing signals RX from second electrodes of a second group among the second electrodes RE1 to RE12.

For example, in an embodiment as shown in FIG. 14 the second circuit 200C3-1 of the sensor driver 200C-1 may output second transmission signals TXB1, TXB3, TXB5, TXB7, TXB9, and TXB11 to second electrodes RE1, RE3, RE5, RE7, RE9, and RE11 of the first group, respectively, and may receive sensing signals RX2, RX4, RX6, RX8, RX10, and RX12 from second electrodes RE2, RE4, RE6, RE8, RE10, and RE12 of the second group, respectively.

Each of the second transmission signals TXB1, TXB3, TXB5, TXB7, TXB9, and TXB11 may sequentially transition to an active level in an eleventh to sixteenth sections P11 to P16. For example, the transmission signal TXB1 may be a pulse signal that periodically swings between the second high level VH2 and the second low level VL2 during the eleventh section P11, and the transmission signal TXB3 may be a pulse signal that periodically swings between the second high level VH2 and the second low level VL2 during the twelfth section P12.

The waveforms of the second transmission signals TXB1, TXB3, TXB5, TXB7, TXB9, and TXB11 illustrated in FIG. 14 are only examples, and embodiments of the present disclosure are not necessarily limited thereto. For example, in an embodiment the second transmission signals TXB1, TXB3, TXB5, TXB7, TXB9, and TXB11 may be maintained at the second high level VH2 in the eleventh to sixteenth sections P11 to P16.

The sensor driver 200C-1 may receive the sensing signals RX2, RX4, RX6, RX8, RX10, and RX12 from the second electrodes RE2, RE4, RE6, RE8, RE10, and RE12, respectively. The sensor driver 200C-1 may output the proximity signal I-PS corresponding to the sensing signals RX2, RX4, RX6, RX8, RX10, and RX12 to the main driver 1000C during the second proximity sensing mode.

As illustrated in FIGS. 14 and 15, in an embodiment, the sensor driver 200C-1 not only transmits the first transmission signals TXA2 to TXA7 to the first electrodes TE2 to TE7, but also transmits the second transmission signals TXB1, TXB3, TXB5, TXB7, TXB9, and TXB11 to the second electrodes RE1, RE3, RE5, RE7, RE9, and RE11.

In an embodiment, each of the second electrodes RE2, RE4, RE6, RE8, RE10, and RE12 may be capacitively coupled to adjacent first electrodes among the first electrodes TE2 to TE7 as well as adjacent second electrodes among the second electrodes RE1, RE3, RE5, RE7, RE9, and RE11. Therefore, the signal level of the sensing signals RX2, RX4, RX6, RX8, RX10, and RX12 received from the second electrodes RE2, RE4, RE6, RE8, RE10, and RE12 may increase. As described in FIG. 11B, when the value of the digital signal in the proximity area PA among the second raw data LD2 increases, the proximity sensing performance of the sensor driver 200C-1 may be increased.

Figure 16:
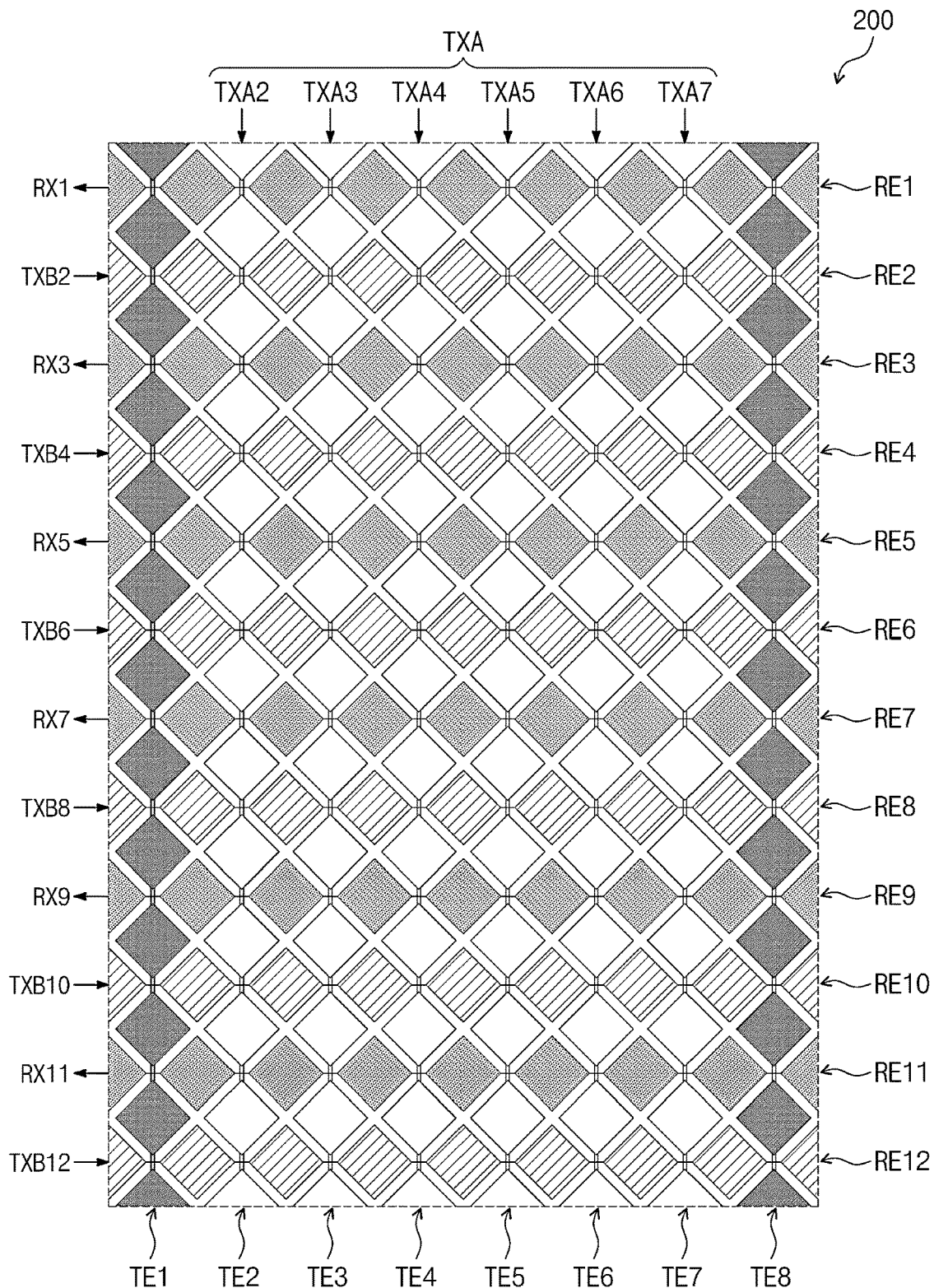
FIG. 16 is a diagram illustrating an operation of a sensor layer when a sensor driver operates in a second proximity sensing mode according to an embodiment of the present disclosure.
Figure 17:
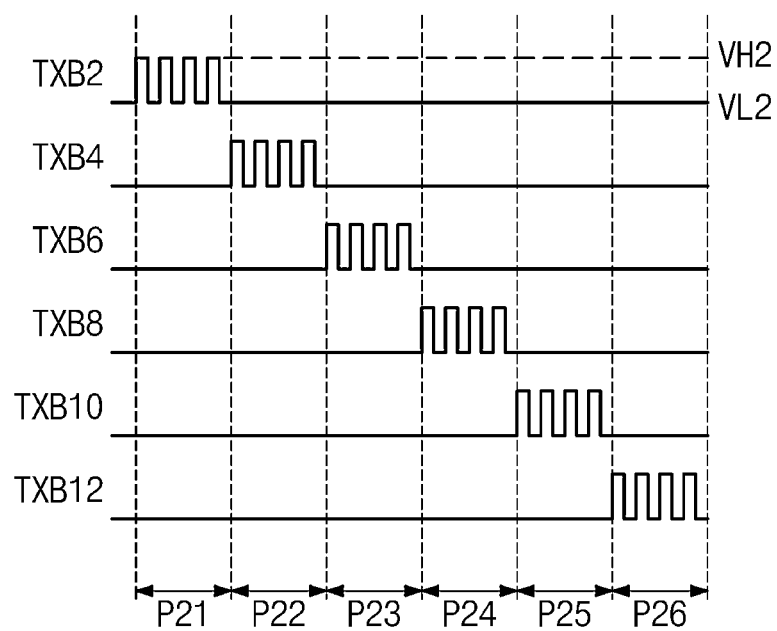
FIG. 17 is a diagram illustrating second transmission signals when a sensor driver operates in a second proximity sensing mode according to an embodiment of the present disclosure.

FIG. 16 is a diagram illustrating an operation of the sensor layer 200 when the sensor driver 200C-1 operates in the second proximity sensing mode. FIG. 17 is a diagram illustrating the second transmission signals TXB2, TXB4, TXB6, TXB8, TXB10, and TXB12 when the sensor driver 200C-1 operates in the second proximity sensing mode.

Referring to FIGS. 16 and 17, in the second proximity sensing mode, the first circuit 200C2-1 of the sensor driver 200C-1 outputs the first transmission signals only to some of the first electrodes TE1 to TE8. In the example illustrated in FIG. 16, the sensor driver 200C-1 outputs the first transmission signals TXA2 to TXA7 only to the first electrodes TE2 to TE7 among the first electrodes TE1 to TE8, respectively. In an embodiment, the waveforms of the first transmission signals TXA2 to TXA7 may be the same as the transmission signals TX2 to TX7 illustrated in FIG. 12.

In an embodiment, each of the first electrodes TE1 and TE8 may be in a non-driven state during the second proximity sensing mode. In an embodiment, during the second proximity sensing mode, the sensor driver 200C-1 may output the transmission signals TX1 and TX8 (FIG. 12) of the second low level VL2 to the first electrodes TE1 and TE8, respectively.

In the second proximity sensing mode, the second circuit 200C3-1 of the sensor driver 200C-1 may output the second transmission signal TXB to some of the second electrodes RE1 to RE12, and may receive the sensing signals RX from the rest of the second electrodes RE1 to RE12.

For example, in an embodiment as shown in FIG. 16, the second circuit 200C3-1 of the sensor driver 200C-1 may output the second transmission signals TXB2, TXB4, TXB6, TXB8, TXB10, and TXB12 to the second electrodes RE2, RE4, RE6, RE8, RE10, and RE12 of the second group, respectively, and may receive the sensing signals RX1, RX3, RX5, RX7, RX9, and RX11 from second electrodes RE1, RE3, RE5, RE7, RE9, and RE11 of the first group, respectively.

Each of the second transmission signals TXB2, TXB4, TXB6, TXB8, TXB10, and TXB12 may sequentially transition to the active level in 21st to 26th sections P21 to P26. For example, in an embodiment, the transmission signal TXB2 may be a pulse signal that periodically swings between the second high level VH2 and the second low level VL2 during the 21st section P21, and the transmission signal TXB4 may be a pulse signal that periodically swings between the second high level VH2 and the second low level VL2 during the 22nd section P22.

The waveforms of the second transmission signals TXB2, TXB4, TXB6, TXB8, TXB10, and TXB12 illustrated in FIG. 17 are only examples, and embodiments of the present disclosure are not necessarily limited thereto. For example, in an embodiment the second transmission signals TXB2, TXB4, TXB6, TXB8, TXB10, and TXB12 may be maintained at the second high level VH2 in the 21st to 26th sections P21 to P26.

The sensor driver 200C-1 may receive the sensing signals RX1, RX3, RX5, RX7, RX9, and RX11 from the second electrodes RE1, RE3, RE5, RE7, RE9, and RE11, respectively. The sensor driver 200C-1 may output the proximity signal I-PS corresponding to the sensing signals RX1, RX3, RX5, RX7, RX9, and RX11 to the main driver 1000C during the second proximity sensing mode.

As illustrated in FIGS. 16 and 17, the sensor driver 200C-1 not only transmits the first transmission signals TXA2 to TXA7 to the first electrodes TE2 to TE7, but also transmits the second transmission signals TXB2, TXB4, TXB6, TXB8, TXB10, and TXB12 to the second electrodes RE2, RE4, RE6, RE8, RE10, and RE12, respectively.

In an embodiment, each of the second electrodes RE1, RE3, RE5, RE7, RE9, and RE11 may be capacitively coupled to adjacent first electrodes among the first electrodes TE2 to TE7 as well as adjacent second electrodes among the second electrodes RE2, RE4, RE6, RE8, RE10, and RE12. Therefore, the signal level of the sensing signals RX1, RX3, RX5, RX7, RX9, and RX11 received from the second electrodes RE1, RE3, RE5, RE7, RE9, and RE11 may increase. As described in FIG. 11B, when the value of the digital signal in the proximity area PA among the second raw data LD2 increases, the proximity sensing performance of the sensor driver 200C-1 may be increased.

In an embodiment, during the second proximity sensing mode, the sensor driver 200C-1 may periodically alternately perform an operation of outputting the second transmission signals TXB1, TXB3, TXB5, TXB7, TXB9, and TXB11 to the second electrodes RE1, RE3, RE5, RE7, RE9, and RE11 of the first group, as illustrated in FIG. 14 and may periodically alternately perform an operation of outputting the second transmission signals TXB2, TXB4, TXB6, TXB8, TXB10, and TXB12 to the second electrodes RE2, RE4, RE6, RE8, RE10, and RE12 of the first group, as illustrated in FIG. 16.

For example, in an embodiment, the sensor driver 200C-1 may output the second transmission signals TXB1, TXB3, TXB5, TXB7, TXB9, and TXB11 to the second electrodes RE1, RE3, RE5, RE7, RE9, and RE11 of the first group for a first time and may output the second transmission signals TXB2, TXB4, TXB6, TXB8, TXB10, and TXB12 to the second electrodes RE2, RE4, RE6, RE8, RE10, and RE12 of the second group for a second time different from the first time.

In FIG. 14, it is illustrated that the second transmission signals TXB1, TXB3, TXB5, TXB7, TXB9, and TXB11 are output to the odd-numbered second electrodes RE1, RE3, RE5, RE7, RE9, and RE11 among the second electrodes RE1 to RE12. In FIG. 16, it is illustrated that the second transmission signals TXB2, TXB4, TXB6, TXB8, TXB10, and TXB12 are output to the even-numbered second electrodes RE2, RE4, RE6, RE8, RE10, and RE12 among the second electrodes RE1 to RE12. However, embodiments of the present disclosure are not necessarily limited thereto and among the second electrodes RE1 to RE12, the number and order of the second electrodes that receive the second transmission signals may be changed in various ways.

For example, in an embodiment, the sensor driver 200C-1 may output the second transmission signals TXB to the second electrodes RE1, RE2, RE5, RE6, RE9, and RE10 among the second electrodes RE1 to RE12, and may receive the sensing signal RX from the second electrodes RE3, RE4, RE7, RE8, RE11, and RE12.

Figure 18:
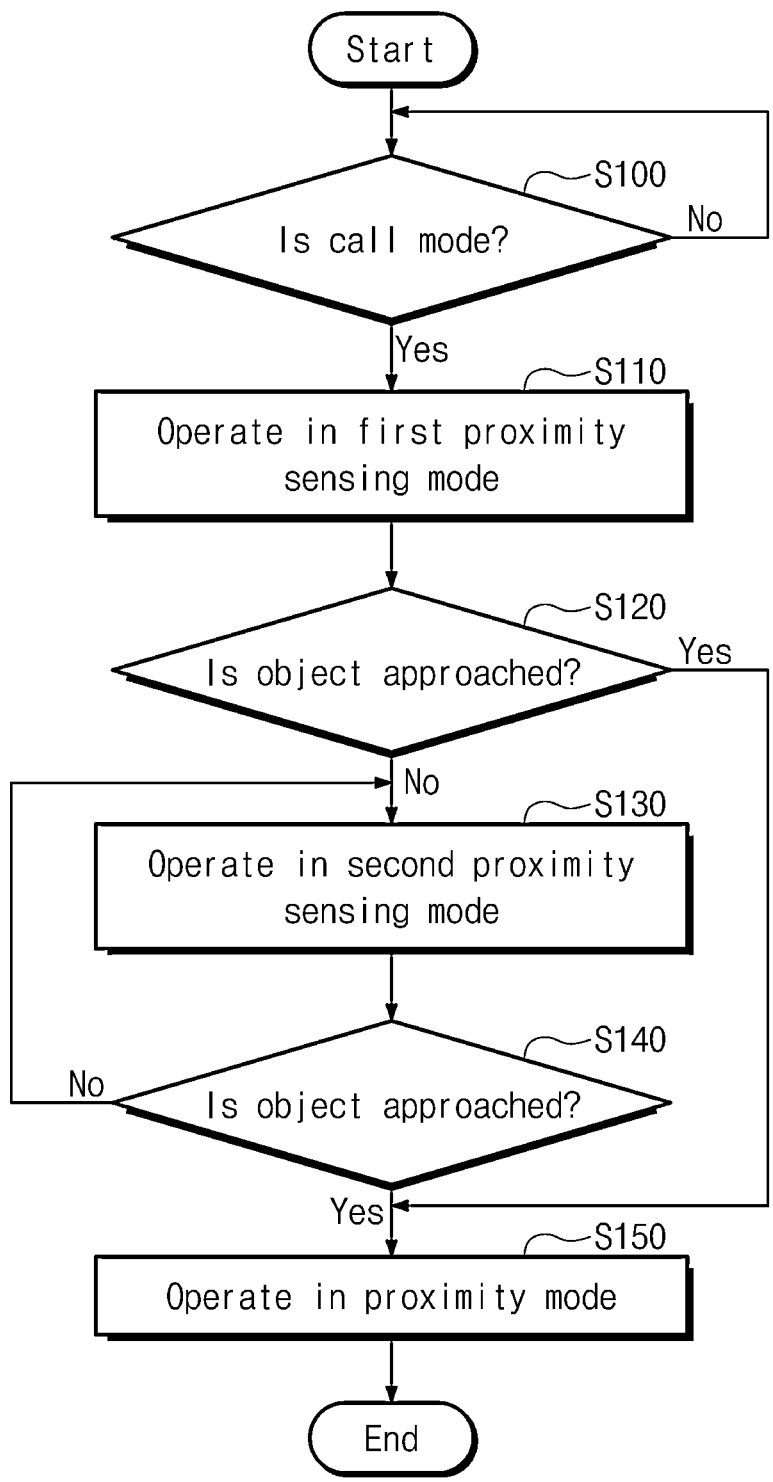
FIG. 18 is a flowchart illustrating an operation of a display device, according to an embodiment of the present disclosure.

FIG. 18 is a flowchart illustrating a method of an operation of a display device, according to an embodiment of the present disclosure.

Referring to FIGS. 6 and 18, the sensor driver 200C receives the control signal I-CS from the main driver 1000C. In an embodiment, the control signal I-CS may include a mode signal indicating the operation mode of the display device 1000 (refer to FIG. 2).

The sensor driver 200C determines whether the mode signal included in the control signal I-CS indicates a call mode in operation S100.

When the mode signal indicates the call mode, the sensor driver 200C operates in the first proximity sensing mode in operation S110.

As illustrated in FIGS. 9 and 10, during the first proximity sensing mode, the first circuit 200C2 of the sensor driver 200C outputs the transmission signals only to some of the first electrodes TE1 to TE8. For example, in an embodiment, the sensor driver 200C may output the transmission signals TX2 to TX7 only to the first electrodes TE2 to TE7 among the first electrodes TE1 to TE8.

In an embodiment, each of the transmission signals TX2 to TX7 during the first proximity sensing mode may be a pulse signal swinging between the first high level VH1 and the first low level VL1. However, embodiments of the present disclosure are not necessarily limited thereto.

The sensor driver 200C may receive the sensing signals RX1 to RX12 from the second electrodes RE1 to RE12, respectively. The sensor driver 200C may obtain the second raw data LD2 as illustrated in FIG. 11B based on the sensing signals RX1 to RX12 received during the first proximity sensing mode.

The sensor driver 200C determines whether the object 3000 (refer to FIG. 2) has approached (e.g., is in proximity) based on the second raw data LD2 in operation S120.

When it is determined that the object 3000 (refer to FIG. 2) has approached the display device 1000, the sensor driver 200C may output the proximity signal I-PS to the main driver 1000C. The main driver 1000C may allow the display device 1000 to operate in the proximity mode in response to the proximity signal I-PS in operation S150.

During the proximity mode, the main driver 1000C may operate the display driver 100C such that the luminance of the image displayed on the display layer 100 is decreased or the image is not displayed on the display layer 100.

When it is not determined that the object 3000 (refer to FIG. 2) has approached (e.g., in proximity to) the display device 1000 based on the second raw data LD2, the sensor driver 200C operates in the second proximity sensing mode in operation S130.

As illustrated in FIGS. 9 and 12, during the second proximity sensing mode, the sensor driver 200C may output the transmission signals TX2 to TX7 only to the first electrodes TE2 to TE7 among the first electrodes TE1 to TE8, respectively.

In an embodiment, each of the transmission signals TX2 to TX7 during the second proximity sensing mode may be a pulse signal swinging between the second high level VH2 and the second low level VL2. However, embodiments of the present disclosure are not necessarily limited thereto.

In an embodiment, the second low level VL2 of each of the transmission signals to TX7 during the second proximity sensing mode may be the same voltage level as the first low level VL1 of each of the transmission signals TX2 to TX7 during the first proximity sensing mode.

In an embodiment, the second high level VH2 of each of the transmission signals TX2 to TX7 during the second proximity sensing mode may be a higher voltage level than the first high level VH1 of each of the transmission signals TX2 to TX7 during the first proximity sensing mode.

In an embodiment, when operating in the second proximity sensing mode, the sensor driver 200C may output the first transmission signals TXA2 to TXA7 only to the first electrodes TE2 to TE7 among the first electrodes TE1 to TE8, respectively. In addition, as illustrated in FIGS. 14 and 15, in an embodiment, when operating in the second proximity sensing mode, the sensor driver 200C may output the second transmission signals TXB1, TXB3, TXB5, TXB7, TXB9, and TXB11 to the second electrodes RE1, RE3, RE5, RE7, RE9, and RE11, respectively, and may receive the sensing signals RX2, RX4, RX6, RX8, RX10, and RX12 from the second electrodes RE2, RE4, RE6, RE8, RE10, and RE12, respectively.

In an embodiment, when operating in the second proximity sensing mode, the sensor driver 200C may output the first transmission signals TXA2 to TXA7 only to the first electrodes TE2 to TE7 among the first electrodes TE1 to TE8, respectively. In addition, as illustrated in FIGS. 16 and 17, when operating in the second proximity sensing mode, the sensor driver 200C may output the second transmission signals TXB2, TXB4, TXB6, TXB8, TXB10, and TXB12 to the second electrodes RE2, RE4, RE6, RE8, RE10, and RE12, respectively, and may receive the sensing signals RX1, RX3, RX5, RX7, RX9, and RX11 from the second electrodes RE1, RE3, RE5, RE7, RE9, and RE11, respectively.

The sensor driver 200C may obtain the second raw data LD2 as illustrated in FIG. 11B, based on the sensing signals RX1 to RX12 (refer to FIG. 9), the sensing signals RX2, RX4, RX6, RX8, RX10, and RX12 (refer to FIG. 14), or the sensing signals RX1, RX3, RX5, RX7, RX9, and RX11 (refer to FIG. 16) received during the second proximity sensing mode.

The sensor driver 200C determines whether the object 3000 (refer to FIG. 2) has approached the display device 1000 based on the second raw data LD2 in operation S140.

In an embodiment, when the proximity of the object 3000 is sensed in the second proximity sensing mode, the sensor driver 200C may output the proximity signal I-PS to the main driver 1000C. The main driver 1000C may allow the display device 1000 to operate in the proximity mode in response to the proximity signal I-PS in operation S150.

As described above, the sensor driver 200C senses the proximity of the object 3000 while operating in the first proximity sensing mode or the second proximity sensing mode, and may output the proximity signal I-PS corresponding to the sensing result to the main driver 1000C.

Other operation of the display device 1000 according to an embodiment is as follows.

When the call mode is entered in operation S100, the main driver 1000C allows the sensor driver 200C to operate in the first proximity sensing mode in operation S110.

The sensor driver 200C may obtain the second raw data LD2 as illustrated in FIG. 11B based on the sensing signals RX1 to RX12 received during the first proximity sensing mode.

The sensor driver 200C may output the second raw data LD2 as the proximity signal I-PS to the main driver 1000C.

The main driver 1000C may operate in the proximity mode when it is determined that the object 3000 has approached the display device 1000 based on the proximity signal I-PS in operation S150.

When it is not determined that the object 3000 has approached the display device 1000 based on the proximity signal I-PS, the main driver 1000C allows the sensor driver 200C to operate in the second proximity sensing mode in operation S130.

The sensor driver 200C may obtain the second raw data LD2 as illustrated in FIG. 11B, based on the sensing signals RX1 to RX12 (refer to FIG. 9), the sensing signals RX2, RX4, RX6, RX8, RX10, and RX12 (refer to FIG. 14), or the sensing signals RX1, RX3, RX5, RX7, RX9, and RX11 (refer to FIG. 16) received during the second proximity sensing mode. The sensor driver 200C may output the second raw data LD2 as the proximity signal I-PS to the main driver 1000C.

The main driver 1000C may operate in proximity mode when it is determined that the object 3000 has approached the display device 1000 based on the proximity signal I-PS in operation S150.

According to an embodiment of the present disclosure, a display device having the above-described configuration may sense a user's touch through a sensor layer. Additionally, proximity sensing is possible through the sensor layer during a call mode. Therefore, there is no need for a separate device for performing proximity sensing. In addition, when proximity sensing is performed using a sensor layer, proximity sensing performance may be increased by increasing the voltage level of transmission signals.

Although an embodiment of the present disclosure has been described for illustrative purposes, those skilled in the art will appreciate that various modifications, and substitutions are possible, without departing from the scope and spirit of the present disclosure. Accordingly, the technical scope of embodiments of the present disclosure is not limited to the described embodiments.

What is claimed is:
1. An input sensor comprising:
a plurality of first electrodes;
a plurality of second electrodes crossing the plurality of first electrodes; and
a sensor driver selectively operating in a first proximity sensing mode and a second proximity sensing mode, the sensor driver outputting a plurality of transmission signals to the plurality of first electrodes and receiving sensing signals from the plurality of second electrodes, and wherein the plurality of transmission signals includes a signal swinging between a first high level and a first low level during the first proximity sensing mode, and the plurality of transmission signals includes a signal swinging between a second high level and a second low level during the second proximity sensing mode, and wherein the second high level is a voltage level greater than the first high level.

2. The input sensor of claim 1, wherein, during the first proximity sensing mode and the second proximity sensing mode, the sensor driver outputs the signal swinging between the first high level and the first low level and the signal swinging between the second high level and the second low level, respectively, only to some of the plurality of first electrodes.

3. The input sensor of claim 1, wherein:

during the first proximity sensing mode, the sensor driver outputs the plurality of transmission signals of the first low level to some of the plurality of first electrodes; and during the second proximity sensing mode, the sensor driver outputs the plurality of transmission signals of the second low level to some of the plurality of first electrodes.

4. The input sensor of claim 1, wherein:

some of the plurality of first electrodes are in a non-driven state during the first proximity sensing mode; and some of the plurality of first electrodes are in the non-driven state during the second proximity sensing mode.

5. The input sensor of claim 1, wherein:

the sensor driver outputs a plurality of first transmission signals to the plurality of first electrodes during the second proximity sensing mode; and during a first time of the second proximity sensing mode, the sensor driver outputs a plurality of second transmission signals to second electrodes of a first group among the plurality of second electrodes, and receives the sensing signals from second electrodes of a second group among the plurality of second electrodes.

6. The input sensor of claim 5, wherein, during the second proximity sensing mode, each of the plurality of first transmission signals and the plurality of second transmission signals is a signal swinging between the second high level and the second low level.

7. The input sensor of claim 5, wherein during a second time of the second proximity sensing mode different from the first time of the second proximity sensing mode, the sensor driver outputs the plurality of second transmission signals to the second electrodes of the second group among the plurality of second electrodes, and receives the sensing signals from the second electrodes of the first group among the plurality of second electrodes.

8. The input sensor of claim 1, wherein the sensor driver receives a mode signal and operates in the first proximity sensing mode when the mode signal indicates a call mode.

9. The input sensor of claim 8, wherein the sensor driver generates raw data based on the sensing signals received from the plurality of second electrodes during the first proximity sensing mode, and determines whether an object has approached based on the raw data.

10. The input sensor of claim 9, wherein the sensor driver operates in the second proximity sensing mode when it is determined that the object has not been approached during the first proximity sensing mode.

11. The input sensor of claim 9, wherein the sensor driver provides a proximity signal to an outside when it is determined that the object is approached during the first proximity sensing mode.

12. The input sensor of claim 1, wherein the sensor driver generates raw data based on the sensing signals received from the plurality of second electrodes during the second proximity sensing mode, determines whether an object has approached based on the raw data, and provides a proximity signal to an outside when it is determined that the object has approached.

13. A display device comprising:

a display layer displaying an image;

a display driver driving the display layer;

a sensor layer disposed on the display layer, the sensor layer including a plurality of first electrodes and a plurality of second electrodes; and a sensor driver selectively operating in a first proximity sensing mode and a second proximity sensing mode, the sensor driver outputting a plurality of transmission signals to the plurality of first electrodes and receiving sensing signals from the plurality of second electrodes, and wherein the plurality of transmission signals includes a signal swinging between a first high level and a first low level during the first proximity sensing mode, and the plurality of transmission signals includes a signal swinging between a second high level and a second low level during the second proximity sensing mode, and wherein the second high level is a voltage level greater than the first high level.

14. The display device of claim 13, wherein:

some of the plurality of first electrodes are in a non-driven state during the first proximity sensing mode; and some of the plurality of first electrodes are in the non-driven state during the second proximity sensing mode.

15. The display device of claim 13, wherein, during the second proximity sensing mode, the sensor driver outputs a plurality of first transmission signals to the plurality of first electrodes, outputs a plurality of second transmission signals to second electrodes of a first group among the plurality of second electrodes, and receives the sensing signals from second electrodes of a second group among the plurality of second electrodes.

16. The display device of claim 15, wherein, during the second proximity sensing mode, each of the plurality of first transmission signals and the plurality of second transmission signals is a signal swinging between the second high level and the second low level.

17. A method of driving a display device, the method comprising:

determining whether a mode signal indicates a call mode;

when the mode signal indicates the call mode, operating in a first proximity sensing mode comprising transmitting a transmission signal swinging between a first high level and a first low level to a plurality of first electrodes and receiving sensing signals from a plurality of second electrodes crossing the plurality of first electrodes;

obtaining raw data based on the sensing signals during the first proximity sensing mode, and determining whether an object has approached the display device based on the raw data;

when it is not determined that the object is approached, operating in a second proximity sensing mode comprising transmitting the transmission signal swinging between a second high level and a second low level to the plurality of first electrodes and receiving the sensing signals from the plurality of second electrodes; and obtaining the raw data based on the sensing signals during the second proximity sensing mode, and determining whether the object has approached the display device based on the raw data, and wherein the second high level is a voltage level greater than the first high level.

18. The method of claim 17, wherein:

in the operating in the first proximity sensing mode, some of the plurality of first electrodes are in a non-driven state; and in the operating in the second proximity sensing mode, some of the plurality of first electrodes are in the non-driven state.

19. The method of claim 17, wherein the operating in the second proximity sensing mode includes:

outputting a plurality of first transmission signals to the plurality of first electrodes;

outputting a plurality of second transmission signals to second electrodes of a first group among the plurality of second electrodes; and receiving the sensing signals from second electrodes of a second group among the plurality of second electrodes.

20. The method of claim 19, wherein, in the operating in the second proximity sensing mode, each of the plurality of first transmission signals and the plurality of second transmission signals is a signal swinging between the second high level and the second low level.

* * * * *